US008294724B2

(12) United States Patent
Suzuki

(10) Patent No.: US 8,294,724 B2
(45) Date of Patent: Oct. 23, 2012

(54) **DISPLAY DEVICE, OUTPUT DEVICE AND COMPUTER-READABLE RECORDING MEDIUM STORING *OUTPUT* CONTROL PROGRAM**

(75) Inventor: Hiroaki Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 957 days.

(21) Appl. No.: 12/340,422

(22) Filed: Dec. 19, 2008

(65) Prior Publication Data

US 2009/0096801 A1  Apr. 16, 2009

Related U.S. Application Data

(63) Continuation-in-part of application No. PCT/JP2007/062970, filed on Jun. 28, 2007.

(30) Foreign Application Priority Data

Jul. 31, 2006  (JP) ................................. 2006-207823
Nov. 13, 2006 (JP) ................................. 2006-307204

(51) Int. Cl.
*G06F 13/00* (2006.01)
*G06F 3/041* (2006.01)
(52) U.S. Cl. ......................... 345/536; 345/537; 345/173
(58) Field of Classification Search .................. 345/536, 345/537, 173, 1.2, 901
See application file for complete search history.

(56) References Cited

U.S. PATENT DOCUMENTS 7,817,146 B2 * 10/2010 Saito et al. .................... 345/177
2004/0160409 A1 8/2004 Kojima et al.

FOREIGN PATENT DOCUMENTS

| JP | 2003058081 A | 2/2003 |
| JP | 2004240238 A | 8/2004 |
| JP | 2004251972 A | 9/2004 |
| JP | 2004286952 A | 10/2004 |

OTHER PUBLICATIONS

Japan Patent Office, Notification of Reasons for Rejection for Japanese Patent Application No. 2006-307204 (counterpart to above-captioned patent application), mailed Jun. 21, 2011.

* cited by examiner

*Primary Examiner* — Hau Nguyen
(74) *Attorney, Agent, or Firm* — Baker Botts L.L.P.

(57) ABSTRACT

A display device includes a plurality of electronic papers that are each provided with a display surface outputting a piece of display data, a binding member that binds together the plurality of electronic papers, and an output device that controls output of the piece of display data to each of the plurality of electronic papers, a first storage device that stores rewrite information, a second storage device that stores a plurality of pieces of display data to be displayed on the plurality of electronic papers, an allocation device that respectively allocates the plurality of pieces of display data stored in the second storage device to a consecutive series of electronic papers for which the rewrite information permits rewriting, and a display control device that respectively displays the plurality of pieces of display data allocated by the allocation device on the consecutive series of electronic papers.

28 Claims, 32 Drawing Sheets

FIG. 6

| PAGE NO. | PAPER NO. | IN-RING POSITION | CONNECTION STATUS | REWRITE INFORMATION |
|---|---|---|---|---|
| \multicolumn{5}{c}{CONNECTED PAPERS MANAGEMENT TABLE} |
| 1 | M00001 | 128 | CONNECTED | INHIBITED |
| 2 | S00234 | 129 | CONNECTED | PERMITTED |
| 3 | S04058 | 130 | CONNECTED | PERMITTED |
| 4 | S03741 | 131 | CONNECTED | PERMITTED |
| 5 | S08507 | 132 | CONNECTED | PERMITTED |

| TEMPORARY REWRITE LIST ||||
|---|---|---|---|
| ID | PAGE NO. | PAGE DATA | START TIME |
| 1 | 2 | CONTENT A: P2 PAGE DATA | 2006/04/28 12:00 |
| 2 | 4 | CONTENT A: P4 PAGE DATA | 2006/04/28 12:00 |
| 3 | 8 | CONTENT B: P8 PAGE DATA | 2006/04/28 12:00 |

DISPLAY DEVICE, OUTPUT DEVICE AND COMPUTER-READABLE RECORDING MEDIUM STORING *OUTPUT* CONTROL PROGRAM

CROSS-REFERENCE TO RELATED APPLICATION

This application is a U.S. continuation-in-part application filed under 35 USC 111(a) claiming benefit under 35 USC 120 and 365(c) of International Application No. PCT/JP2007/062970, filed Jun. 28, 2007, which claims priority to Application Ser. Nos. 2006-207823, filed in Japan on Jul. 31, 2006, and 2006-307204, filed in Japan on Nov. 13, 2006. The disclosure of the foregoing applications is hereby incorporated by reference in their entireties.

BACKGROUND

The present disclosure relates to a display device, an output device and a computer-readable recording medium storing an output control program that allow a plurality of electronic papers to be retained in abound-together form, allow display data to be output to the electronic papers from the output device, and allow viewing of a content formed of the display data, including a text or an image.

In recent years, an electronic paper, a flexible and thin display medium, has been developed as an alternative to a paper medium, in order to view a content formed of display data of computerized text or image. With an electronic paper, the displayed content can be updated by repeated overwriting or deletion of the display data. When a user wishes to view a content including a large volume of data, it is considered convenient to use a plurality of electronic papers bound together, as with a book or a notebook. Here, a binder-type format (hereinafter referred to as a "file") is proposed, where a plurality of electronic papers are used in a bound-together form, in the same way as a paper.

With an electronic paper, display data can be overwritten (rewritten), but, depending on the content, the user may wish to save the display data with the display data displayed, without rewriting the display data. However, when electronic papers are connected together as a file, it is not clear which electronic paper can be overwritten and which electronic paper cannot be overwritten, resulting in concerns that an image the user wishes to save may be deleted by overwriting.

Here, a system has been disclosed, for example, in Japanese Laid-Open Patent Publication No. 2004-251972 in which information about whether or not the electronic paper can be overwritten is stored in the attribute information of the electronic paper itself. Accordingly, an electronic paper that has overwrite-inhibit information written in cannot be overwritten. Further, in the above-mentioned publication, in accordance with instructions by a user, the attribute data can be displayed alongside the image data.

SUMMARY

When electronic papers are used together as a file, electronic papers that cannot be overwritten may be included among electronic papers that can be overwritten. In such a case, when the user wishes to display the content of a plurality of pages, an overwrite-inhibited electronic page may be intercalated between consecutive pages, making the content difficult to read. The above-described known technology does not disclose any method to deal with such a situation.

Various exemplary embodiments of the broad principles derived herein provide a display device, an output device and a computer-readable recording medium storing an output control program that allow appropriate display even when overwrite-inhibited electronic pages are intercalated between a plurality of electronic pages.

Exemplary embodiments provide a display device that includes a plurality of electronic papers that are each provided with a display surface, the display surface outputting a piece of display data, the piece of display data being a piece of data for an image and/or a text in a page unit, a binding member that binds together the plurality of electronic papers, an output device that controls output of the piece of display data to each of the plurality of electronic papers, a first storage device that stores rewrite information indicating whether or not to permit rewriting of the piece of display data on each of the plurality of electronic papers, a second storage device that stores a plurality of pieces of display data to be displayed on the plurality of electronic papers, an allocation device that respectively allocates the plurality of pieces of display data stored in the second storage device to a consecutive series of electronic papers for which the rewrite information permits rewriting, based on the rewrite information stored in the first storage device, and a display control device that respectively displays the plurality of pieces of display data allocated by the allocation device on the consecutive series of electronic papers.

Exemplary embodiments also provide an output device that controls output of a piece of display data displayed on each of a plurality of electronic papers, the piece of display data being a piece of data for an image and/or a text in a page unit, the plurality of electronic papers being each provided with a display surface and bound together by a binding member. The output device includes a first storage device that stores rewrite information indicating whether or not to permit rewriting of the piece of display data on each of the plurality of electronic papers, a second storage device that stores a plurality of pieces of display data to be displayed on the plurality of electronic papers, an allocation device that respectively allocates the plurality of pieces of display data stored in the second storage device to a consecutive series of electronic papers for which the rewrite information permits rewriting, based on the rewrite information stored in the first storage device, and a display control device that respectively displays the plurality of pieces of display data allocated by the allocation device on the consecutive series of electronic papers.

Exemplary embodiments further provide a computer-readable recording medium storing an output control program. The output control program controls output of a piece of display data displayed on each of a plurality of electronic papers, the piece of display data being a piece of data for an image and/or a text in a page unit, the plurality of electronic papers being each provided with a display surface and bound together by a binding member. The program includes instructions that cause a controller to perform the steps of respectively allocating a plurality of pieces of display data to a consecutive series of electronic papers for which rewrite information permits rewriting, based on the rewrite information indicating whether or not to permit rewriting of the piece of display data on each of the plurality of electronic papers, and controlling display of the plurality of pieces of display data allocated in the allocating step on the consecutive series of electronic papers respectively.

BRIEF DESCRIPTION OF THE DRAWINGS

Exemplary embodiments will be described below in detail with reference to the accompanying drawings in which:

FIG. 6 is a schematic diagram showing data structure of a connected papers management table stored in a first table storage area;

DETAILED DESCRIPTION OF THE EXEMPLARY EMBODIMENTS

Hereinafter, a display device 1 that is an exemplary embodiment of the present disclosure will be described in detail with reference to the appended drawings. The display device 1 is a binder type (file) device that includes a plurality of electronic papers. The structure of the display device 1 will be explained with reference to FIG. 1 to FIG. 8 and FIG. 30 to FIG. 32.

Figure 1:
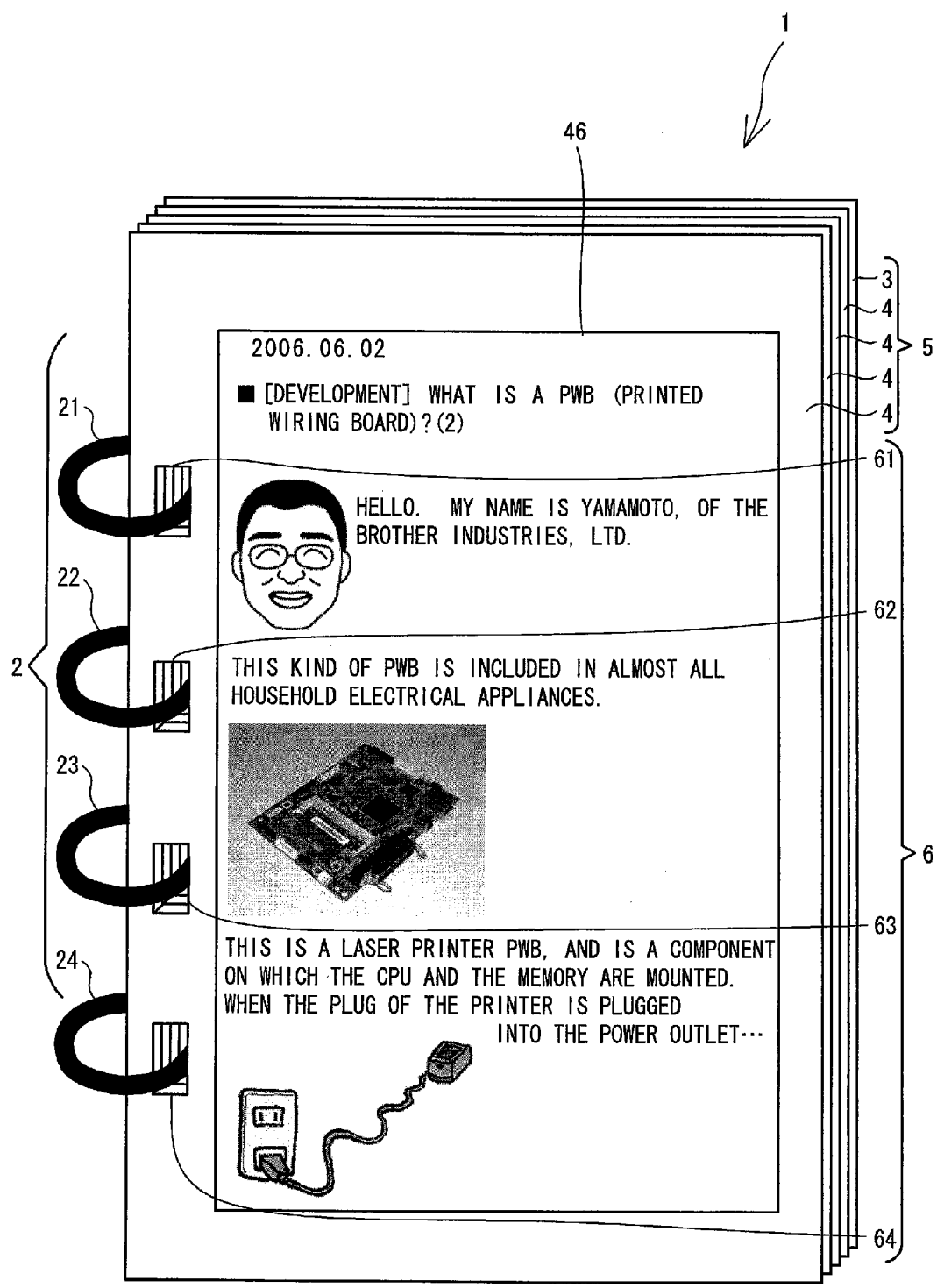
FIG. 1 is an outline diagram schematically showing the external appearance of a display device.

As shown in FIG. 1, the display device 1 includes a master paper 3 that is a substantially rectangular electronic paper and slave papers 4 that are electronic papers with the same shape as the master paper 3. The master paper 3 includes a display portion 36 (see FIG. 3), and each of the slave papers 4 include a display portion 46. The master paper 3 and each of the slave papers 4 are provided with four through-holes 61 to 64 and are bound together by a binding member 2 that is formed of four rings 21 to 24 that pass through the through-holes 61 to 64 respectively. In the present embodiment, an example is explained with four slave papers 4 (for ease of explanation, the slave papers 4 are sometimes referred to in the singular) Below, the master paper 3 and the slave papers 4 are collectively referred to as electronic papers 5. The master paper 3 acts as an output device, and controls an image and/or a text displayed on the display portions 36 and 46 of the master paper 3 and the slave papers 4.

Figure 30:
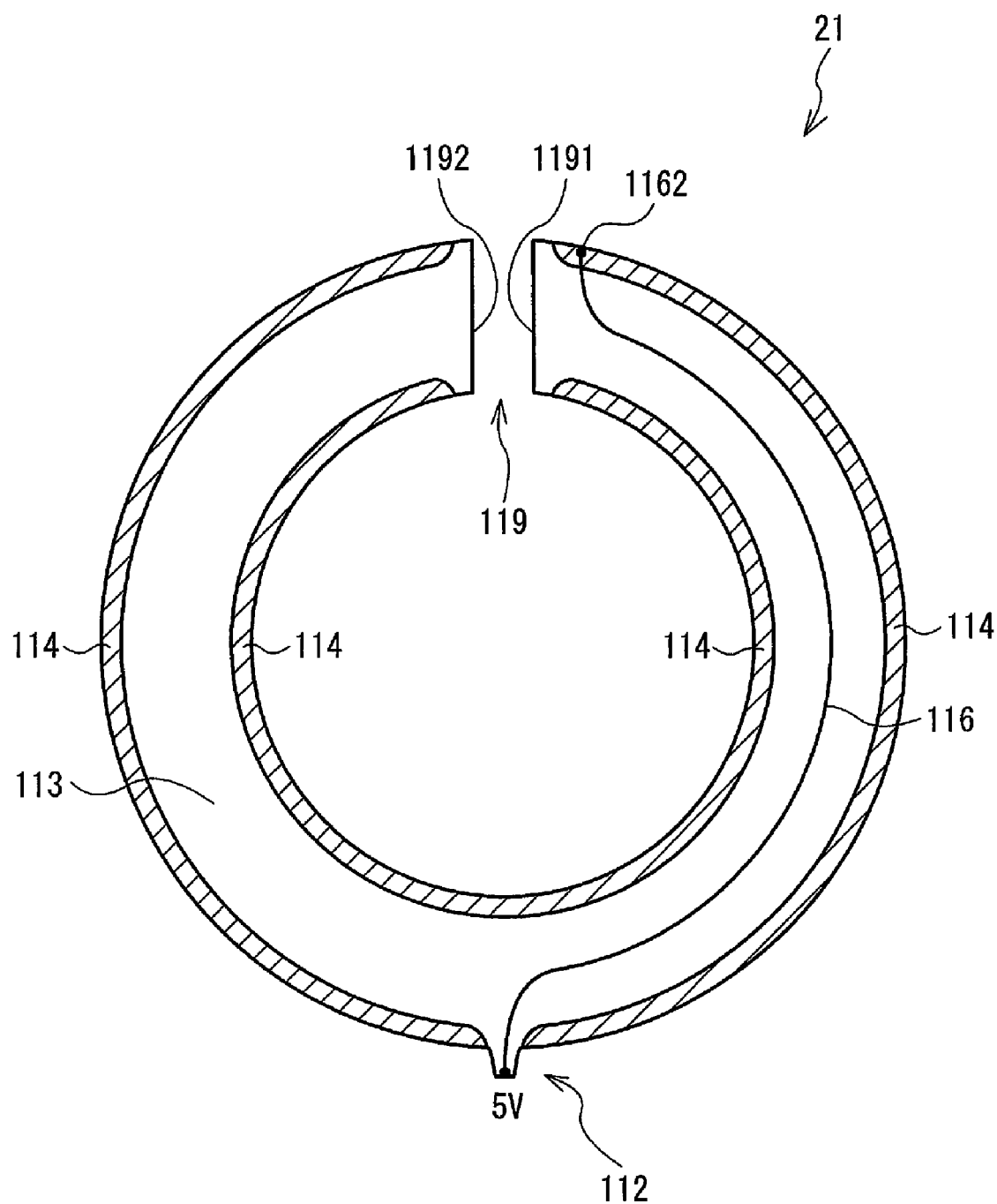
FIG. 30 is a schematic diagram showing a cross section of a power supply ring 21.
Figure 31:
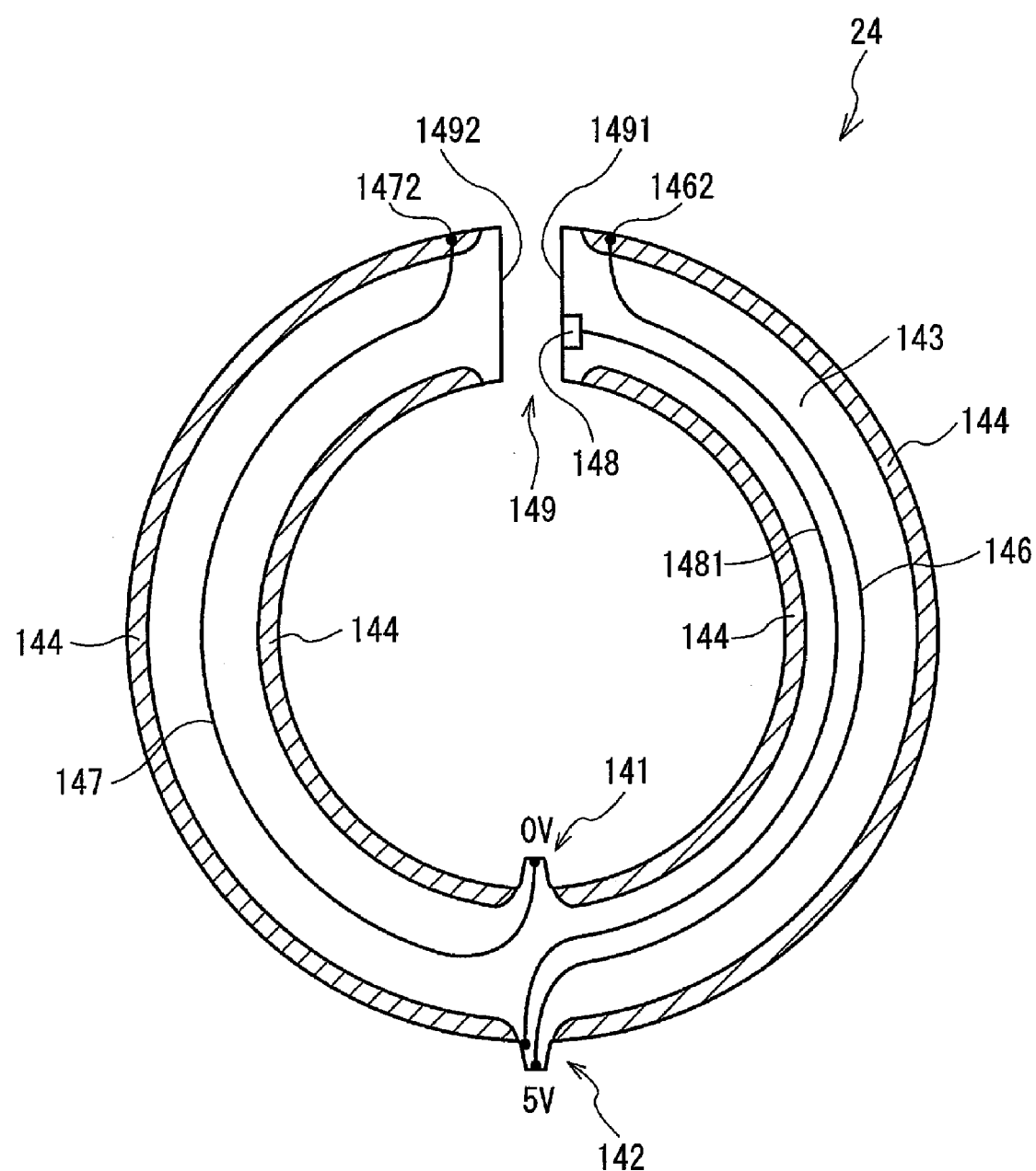
FIG. 31 is a schematic diagram showing a cross section of a position detection ring 24.
Figure 32:
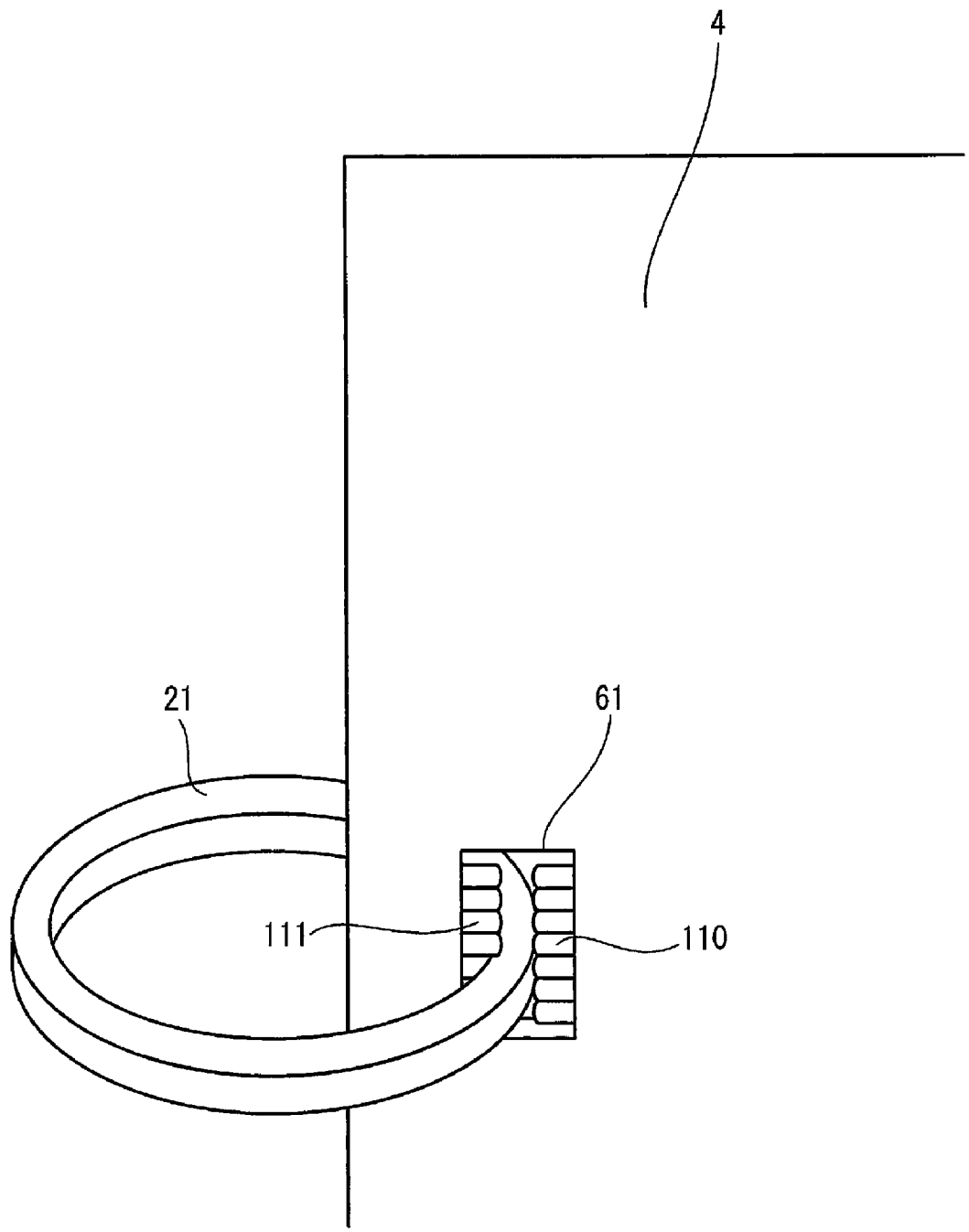
FIG. 32 is a schematic diagram showing a condition in which the power supply ring 21 is passed through a power supply through-hole 61.

The binding member 2 of the electronic papers 5 will be explained with reference to FIG. 1, and FIG. 30 to FIG. 32. As shown in FIG. 1, the electronic papers 5 are provided with the four through-holes 61 to 64, namely the electric power supply through-hole 61, the grounding through-hole 62, the communications through-hole 63 and the position detection through-hole 64. Hereinafter, the four through-holes 61 to 64 will be collectively referred to as the through-holes 6. The binding member 2 is formed of the four rings 21 to 24, namely the electric power supply ring 21, the grounding ring 22, the communications ring 23 and the position detection ring 24. The electric power supply ring 21 is inserted in the electric power supply through-hole 61, the grounding ring 22 is inserted in the grounding through-hole 62, the communications ring 23 is inserted in the communications through-hole 63, and the position detection ring 24 is inserted in the position detection through-hole 64, thus binding the electronic papers 5. Each of the rings 21 to 24 is fixed to the master paper 3. Electro-conductive brushes 110 and 111 are provided inside each through-hole 6 of the slave papers 4. The electro-conductive brushes 110 and 111 are directed towards the center of the through-holes 61 to 64. Contact between the electro-conductive brushes 110 and 111 and each of the rings 21 to 24 is firmly established. The electric power supply ring 21 will be explained as a specific example. As shown in FIG. 32, the electro-conductive brushes 110 and 111 are provided respectively on the longer sides of the inside of the electric power supply through-hole 61. The electro-conductive brushes 110 and 111 are in contact with the electric power supply ring 21 that passes through the inside of the electric power supply through-hole 61.

The electric power supply ring 21 is connected to a battery 54 provided in the master paper 3 (see FIG. 3), and supplies electric power to the slave paper 4. The grounding ring 22 is connected to a 0V earth 55 provided in the master paper 3 (see FIG. 3), and is used to ground the slave paper 4. The communications ring 23 is connected to an internal communications portion 35 provided in the master paper 3 (see FIG. 3) and to an internal communications portion 45 provided in the slave paper 4 (see FIG. 3), and is used to perform information exchanges between the electronic papers 5. The position detection ring 24 is used to detect in what order the electronic papers 5 are bound together by the binding member 2.

The electric power supply ring 21 will be explained with reference to FIG. 30 and FIG. 32. As shown in FIG. 30, the electric power supply ring 21 is a flexible open and closable ring that is cut at ends 1191 and 1192. By separating the ends 1191 and 1192, namely by opening an open and closable section 119, the user can cause the electric power supply ring 21 to flex and can remove and insert the electronic papers 5 from the open and closable section 119. As shown in FIG. 30, the end 1191 of the open and closable section 119 of the electric power supply ring 21 is the end on the right hand side of the page of FIG. 30, and the end 1192 is the end on the left hand side of the page.

The inner section of the electric power supply ring 21 is an insulator 113, and the surface of the insulator 113 is covered by a conductor 114. As shown in FIG. 30, the electric power supply ring 21 is provided with a protruding section 112 and the protruding section 112 is not covered by the conductor 114. The ends 1191 and 1192 are also not covered by the conductor 114, and when the open and closable section 119 is closed, a portion of the conductor 114 does not come into contact with another portion of the conductor 114. A conductor wire 116 is embedded in the inner section of the insulator 113. One end of the conductor wire 116 can be externally connected from the protruding section 112 and the other end of the conductor wire 116 is connected to the conductor 114 by a connecting point 1162 provided in the end of the conductor 114 on the side of the end 1191.

A concave section is provided on the inside the electric power supply through-hole 61 of the master paper 3. One end of the conductor wire 116 that is connected to the battery 54 (see FIG. 3) is connected to the concave section. The protruding section 112 of the electric power supply ring 21 fits into the concave section of the master paper 3, thus fixing the electric power supply ring 21 to the master paper 3. A 5V voltage is applied to the conductor wire 116 from the battery 54 and an electric current runs through the conductor 114 from the connecting point 1162 of the conductor wire 116.

As shown in FIG. 32, the electro-conductive brushes 110 and 111 are provided on the inside of the electric power supply through-hole 61 of the slave paper 4, and are in contact with the conductor 114. The voltage obtained from the electro-conductive brushes 110 and 111 is applied to a power supply circuit (not shown in the figures), the power supply circuit being the power source to drive the slave paper 4.

The position detection ring 24, and the method of detecting the binding order of the electronic papers 5 by the position detection ring 24 will be explained with reference to FIG. 2 and FIG. 31. As shown in FIG. 31, the position detection ring 24 is a flexible open and closable ring that is cut at ends 1491 and 1492. By separating the ends 1491 and 1492, namely by opening an open and closable section 149, the user can cause the position detection ring 24 to flex and can remove and insert the electronic papers 5 from the open and closable section 149. As shown in FIG. 31, the end 1491 of the open and closable section 149 of the position detection ring 24 is the end on the right hand side of the page of FIG. 31, and the end 1492 is the end on the left hand side of the page.

The inner section of the position detection ring 24 is an insulator 143, and the surface of the insulator 143 is covered by an electrically resistive body 144 such as carbon. As shown in FIG. 31, the position detection ring 24 is provided With protruding sections 141 and 142 and the protruding sections 141 and 142 are not covered by the electrically resistive body 144. The ends 1491 and 1492 are also not covered by the electrically resistive body 144, and when the open and closable section 149 is closed, a portion of the electrically resistive body 144 do not come into contact with another portion of the electrically resistive body 144.

A switch 148 that detects the opening and closing of the position detection ring 24 is provided at the end 1491 of the open and closable section 149. The switch 148 is a pressure-sensitive sensor that is ON when the position detection ring 24 is closed, and is OFF when the position detection ring 24 is open. The switch 148 is connected to one end of a conductor wire 1481 embedded in the insulator 143 of the position detection ring 24, and the other end of the conductor wire 1481 can be externally connected via the protruding section 142.

Two concave sections are provided on the inside of the position detection through-hole 64 of the master paper 3. The concave sections are located in parallel with the shorter edges of the master paper 3, facing each other. The concave section near the inside of the master paper 3 is connected to one end of a conductor wire 146 that is connected to the battery 54 (see FIG. 3), and to one end of a conductor wire 1481 that is connected to an opening/closing detection portion 39 (see FIG. 3). The concave section near the outside of the master paper 3 is connected to one end of a conductor wire 147 that is connected to the earth 55 (see FIG. 3).

The protruding sections 141 and 142 of the position detection ring 24 fit into the concave sections of the master paper 3, thus fixing the position detection ring 24 to the master paper 3. A 5V voltage is applied to the conductor wire 146 from the battery 54, an electric current runs through the electrically resistive body 144 from a connecting point 1462 of the conductor wire 146, while an electric current runs from a connecting point 1472 of a conductor wire 147 through the conductor wire 147 to the earth 55. As the ends 1491 and 1492 are not covered by the electrically resistive body 144, the ends 1491 and 1492 do not short-circuit when the open and closable section 149 is closed. Power is supplied from the battery 54, and while the power is running through the electrically resistive body 144, the voltage is lowered by the resistance of the electrically resistive body 144 and the voltage lowers in a direction from the end 1491 to the end 1492 of the position detection ring 24.

Figure 3:
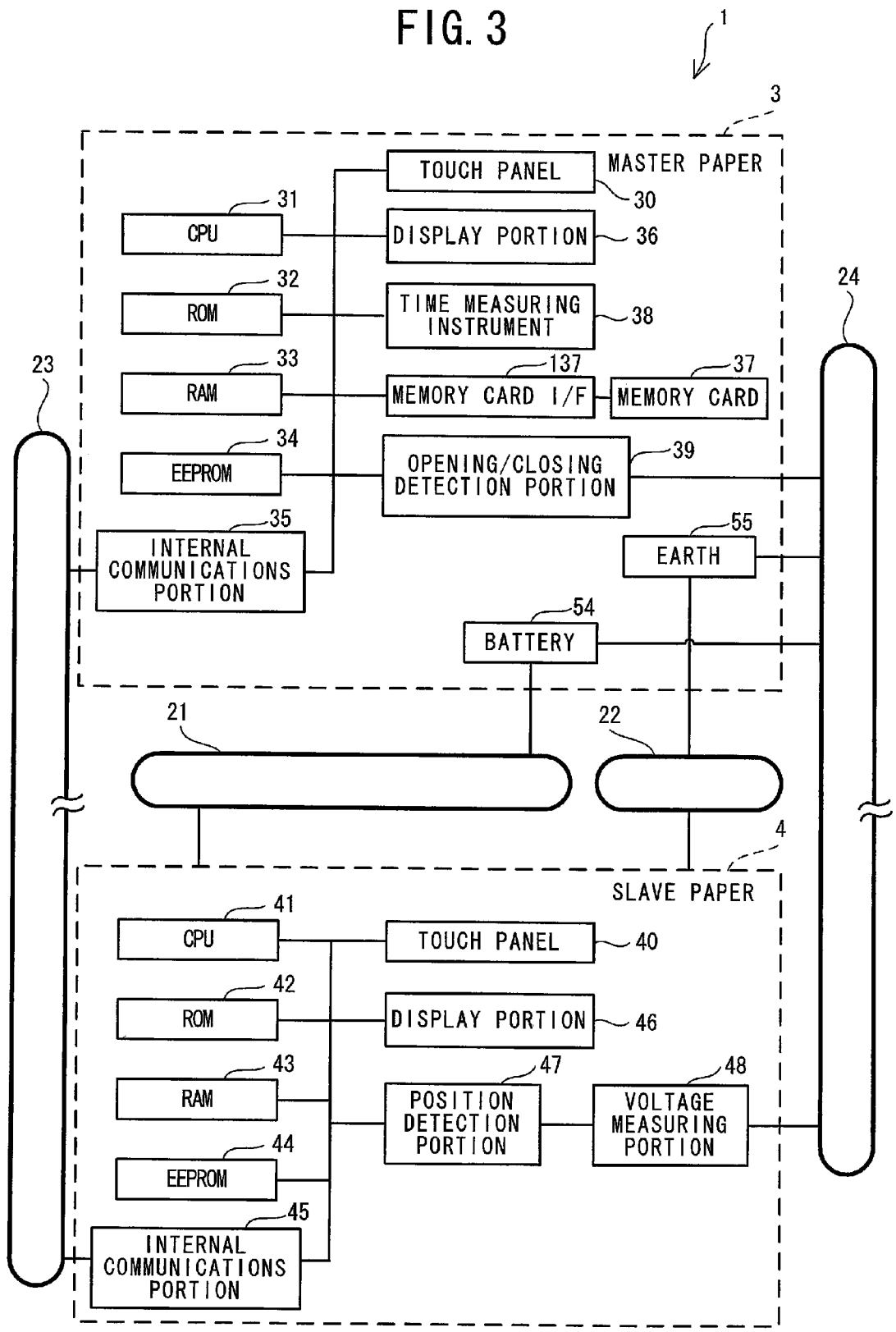
FIG. 3 is a block diagram showing the structure of the display device.

The slave paper 4 is provided with a voltage measuring portion 48 that is a voltmeter (see FIG. 3). The electro-conductive brushes 110 and 111 provided on the position detection through-hole 64 function as terminals for the voltage measuring portion 48, and measure the voltage of the current flowing through the position detection ring 24 that is inserted in the position detection through-hole 64. The voltage value measured by the voltage measuring portion 48 is converted from analog to digital (hereinafter referred to as "A/D converted") to a value from 0 to 255 by a position detection portion 47. As the voltage lowers in the direction from the end 1491 to the end 1492 of the position detection ring 24, the voltage value measured by the voltage measuring portion 48 differs depending on the position in which the slave paper 4 is located within the position detection ring 24. It is therefore possible to detect the position in which the slave paper 4 is located within the position detection ring 24 as a value from 0 to 255, and the order of binding of the electronic papers 5 can be detected. In a connected papers management table (see FIG. 6), the A/D converted value is used as the "in-ring position" that indicates the position of each of the electronic papers 5 within the position detection ring 24.

Figure 2:
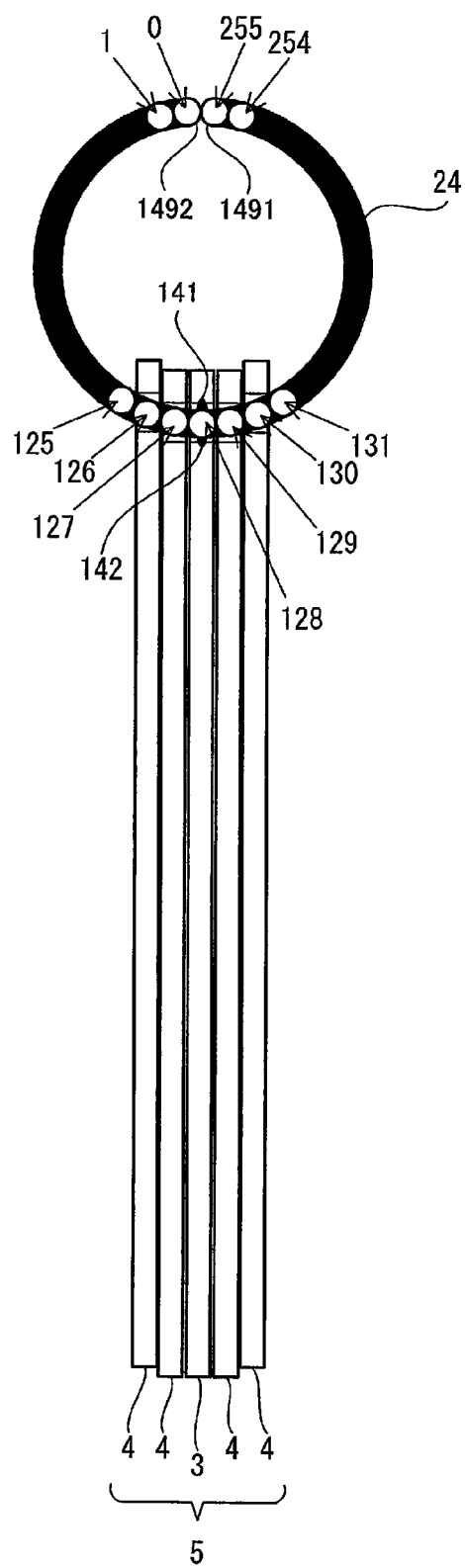
FIG. 2 is an explanatory diagram illustrating a position detection ring of the display device.

As shown in FIG. 2, when the slave paper 4 is at the end 1491, the voltage value measured by the voltage measuring portion 48 of the slave paper 4 is detected as the A/D converted value "255" by the position detection portion 47. When the slave paper 4 is immediately to the right of the end 1491 in FIG. 2, the A/D converted value is detected as "254." When the slave paper 4 is at the end 1492, the A/D converted value is detected as "0." When the slave paper 4 is immediately to the left of the end 1492 in FIG. 2, the A/D converted value is detected as "1." The master paper 3 is fixed to the position detection ring 24 in a position corresponding to the A/D converted value "128." When the slave paper 4 is immediately to the right of the master paper 3 in FIG. 2, the A/D converted value is detected as "129." If the slave paper 4 is in the next position to the right, the A/D converted value is detected as "130," and if the slave paper 4 is in the position once more to the right, the A/D converted value is detected as "131." When the slave paper 4 is immediately to the left of the master paper 3, the A/D converted value is detected as "127." If the slave paper 4 is in the next position to the left, the A/D converted value is detected as "126," and if the slave paper 4 is in the position once more to the left, the A/D converted value is detected as "125."

The electrical structure of the display device 1 will be explained with reference to FIG. 3. As shown in FIG. 3, the display device 1 is formed of the master paper 3 and the slave papers 4. A plurality of the slave papers 4 can be connected, but as the electrical structure is the same for all of the slave papers 4, only a single slave paper 4 is shown in FIG. 3.

The master paper 3 includes a CPU 31, a ROM 32, a RAM 33 and an EEPROM 34. The CPU 31 controls the master paper 3 as a whole. The ROM 32 stores programs etc. The RAM 33 temporarily stores data. A manufacturing number of the master paper 3 is stored in the EEPROM 34. The ROM 32, the RAM 33 and the EEPROM 34 are connected by bus to the CPU 31.

A touch panel 30, the display portion 36, a memory card interface (I/F) 137, the internal communications portion 35, a time measuring instrument 38, and the opening/closing detection portion 39 are connected by bus to the CPU 31. The touch panel 30 is configured to accept instructions about whether or not the data being displayed can be rewritten, or instructions to restore temporarily rewritten display data, which are inputted by the user. The display portion 36 displays the display data so that the display data can be viewed. The memory card interface (I/F) 137 is configured to read a memory card 37 that stores the display data or the display data location information. The internal communications portion 35 is connected to the communications ring 23 and includes a communication circuit that performs data communications with the slave paper 4. The time measuring instrument 38 is used to measure time. The opening/closing detection portion 39 is connected to the switch 148 of the position detection ring 24 and detects the opening and closing of the position detection ring 24.

A content including a plurality of display data is stored in the memory card 37. One set of the display data includes one page worth of an image and/or a text. Based on one set of the display data, one page worth of an image and/or a text is output to the display portion 36 or the display portion 46 of the electronic papers 5. A plurality of the content may be stored in the memory card 37.

In addition to the display data, display rewrite permit/inhibit information (hereinafter referred to as "rewrite information") may also be displayed on the display portion 36. The method of displaying rewrite information is not limited to display on the display portion 36. For example, the shape of the electronic papers 5 may change, such as folding a corner of the electronic paper 5, or a part of the electronic paper 5 may protrude or the like.

The master paper 3 includes the battery 54 and the earth 55. The battery 54 supplies power to the master paper 3 and the slave paper 4 that is bound by the binding member 2. The earth 55 is used to operate the display device 1 in a stable manner. In order to supply power to the slave paper 4, the battery 54 is connected to the electric power supply ring 21. For the stable operation of the slave paper 4, the earth 55 is connected to the grounding ring 22. In order for the electric current to flow to the position detection ring 24, the battery 54 and the earth 55 are connected to the position detection ring 24.

The slave paper 4 includes a CPU 41, a ROM 42, a RAM 43, and an EEPROM 44. The CPU 41 controls the slave paper 4 as a whole. The ROM 42 stores programs etc. The RAM 43 temporarily stores data. A manufacturing number of the slave paper 4 is stored in the EEPROM 44. The ROM 42, the RAM 43 and the EEPROM 44 are connected by bus to the CPU 41. A touch panel 40 and the display portion 46 are also connected to the CPU 41. The touch panel 40 is used by the user to input instructions about whether or not the data being displayed can be rewritten. The display portion 46 is used to display the display data so that the display data can be viewed.

The internal communications portion 45 is also connected by bus to the CPU 41. The internal communications portion 45 is connected to the communications ring 23 and includes a communication circuit that performs data communications with the master paper 3. The slave paper 4 also includes the voltage measuring portion 48. The voltage measuring portion 48 is connected to the electrically resistive body 144 of the position detection ring 24 (see FIG. 31), and measures the voltage of the electrically resistive body 144. The position detection portion 47 is also connected by bus to the CPU 41. The position detection portion 47 is connected to the voltage measuring portion 48, performs A/D conversion on the measured voltage and detects the position in which the slave paper 4 is located.

Figure 4:
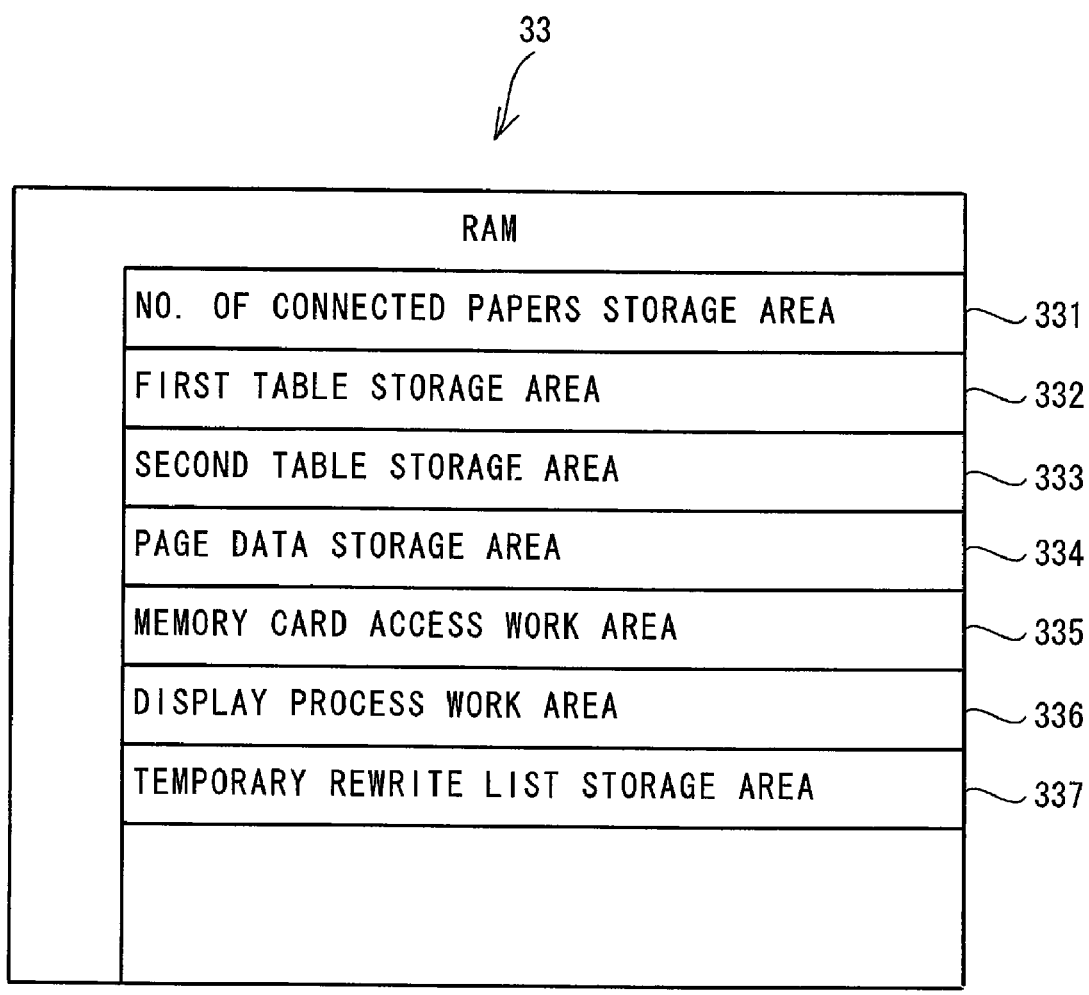
FIG. 4 is a schematic diagram showing data structure of a master paper RAM.

The RAM 33 of the master paper 3 will be explained with reference to FIG. 4. As shown in FIG. 4, the RAM 33 includes a number of connected papers storage area 331, a first table storage area 332, a second table storage area 333, a page data storage area 334, a memory card access work area 335, a display process work area 336, and a temporary rewrite list storage area 337. The number of connected papers storage area 331 stores the number of electronic papers 5 currently bound in the display device 1. The first table storage area 332 stores a connected papers management table (see FIG. 6) that indicates what is to be displayed on which electronic paper 5. The second table storage area 333 stores the connected papers management table as a previous state management table. The page data storage area 334 stores the display data displayed on the display portion 36. The memory card access work area 335 is used as a temporary usage area when the memory card 37 is accessed. The display process work area 336 is an area for temporary use. When the electronic paper 5 is set to inhibit rewriting but the electronic paper 5 is temporarily rewritten, the temporary rewrite list storage area 337 is used to temporarily store the content. The RAM 33 also includes storage areas other than those shown in the figures.

Figure 5:
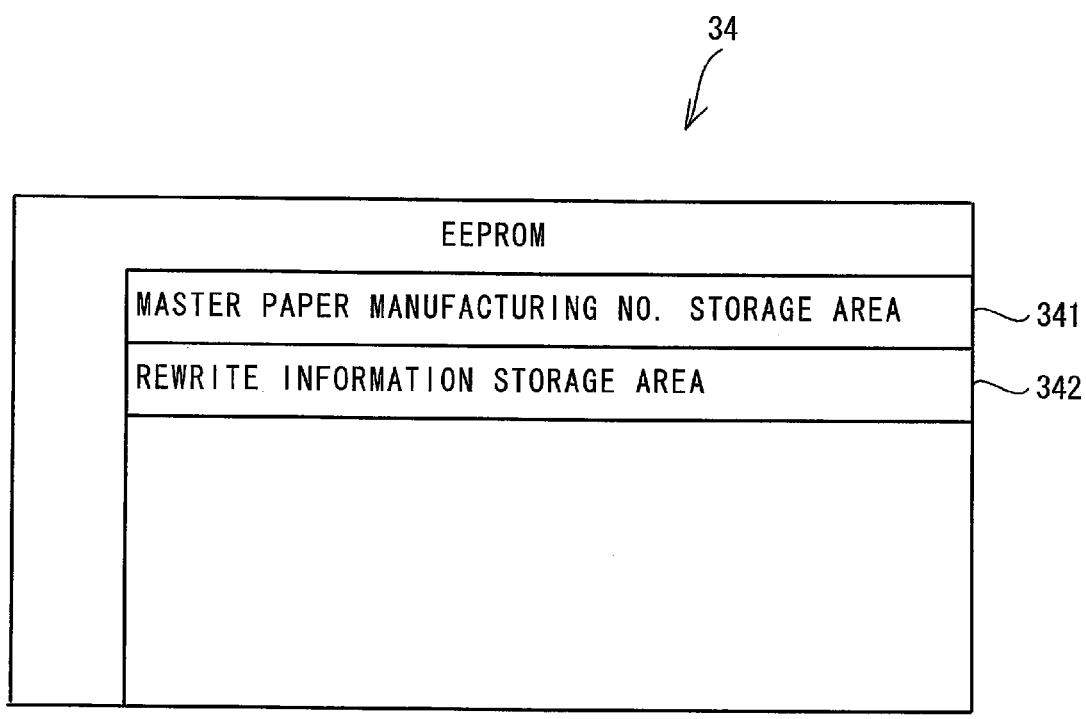
FIG. 5 is a schematic diagram showing data structure of a master paper EEPROM.

The EEPROM 34 of the master paper 3 will be explained with reference to FIG. 5. As shown in FIG. 5, the EEPROM 34 includes a master paper manufacturing number storage area 341, and a rewrite information storage area 342. The master paper manufacturing number storage area 341 stores the manufacturing number of the master paper 3. The rewrite information storage area 342 stores rewrite information that indicates whether rewriting of the content being displayed on the display portion 36 of the master paper 3 is allowed or disallowed. The manufacturing number stored in the master paper manufacturing number storage area 341 is a unique number for each master paper 3, and is identification information uniquely identifying the master paper 3 from any other master paper 3.

The connected papers management table stored in the first table storage area 332 will be explained with reference to FIG. 6. Items in the connected papers management table include a page number 3321, a paper number 3322, an in-ring position 3323, and a connection status 3324. The page number 3321 indicates the order of the bound electronic papers 5. The paper number 3322 is the manufacturing number of each electronic paper 5. The in-ring position 3323 indicates the position information of the electronic papers 5 as a value from 0 to 255. The connection status 3324 indicates whether or not the electronic paper 5 is connected to the binding member 2. Data for the above items are stored for each of the electronic papers 5. Rewrite information 3325 for each of the electronic papers 5 is acquired from the slave paper 4 when the display data is written and stored when necessary. Here, for ease of explanation, the rewrite information 3325 is listed in FIG. 6 alongside the connected papers management table.

Figure 7:
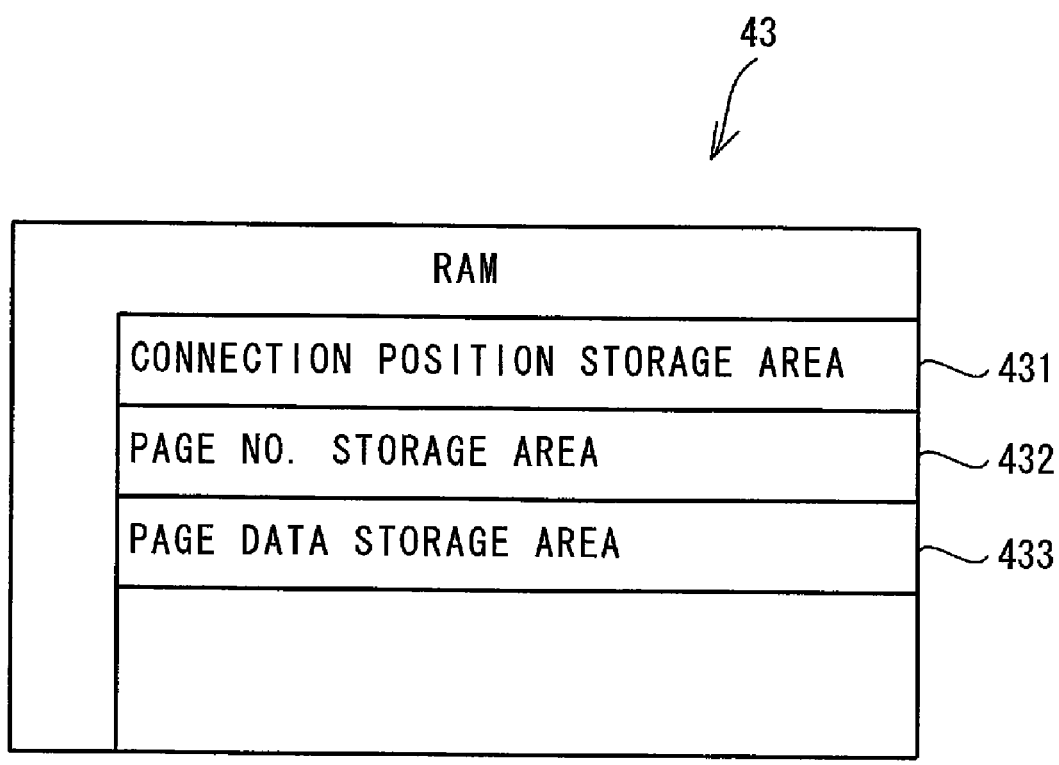
FIG. 7 is a schematic diagram showing data structure of a slave paper RAM.

The RAM 43 of the slave paper 4 will be explained with reference to FIG. 7. As shown in FIG. 7, the RAM 43 includes a connection position storage area 431, a page number storage area 432, and a page data storage area 433. The RAM 43 also includes storage areas other than those shown in FIG. 7. The connection position storage area 431 stores position information that is the detection result of the position detection portion 47. The page number storage area 432 stores a page number that indicates the number of the slave paper 4 among the bound electronic papers 5. The page data storage area 433 stores the display data that is displayed on the display portion 46.

Figure 8:
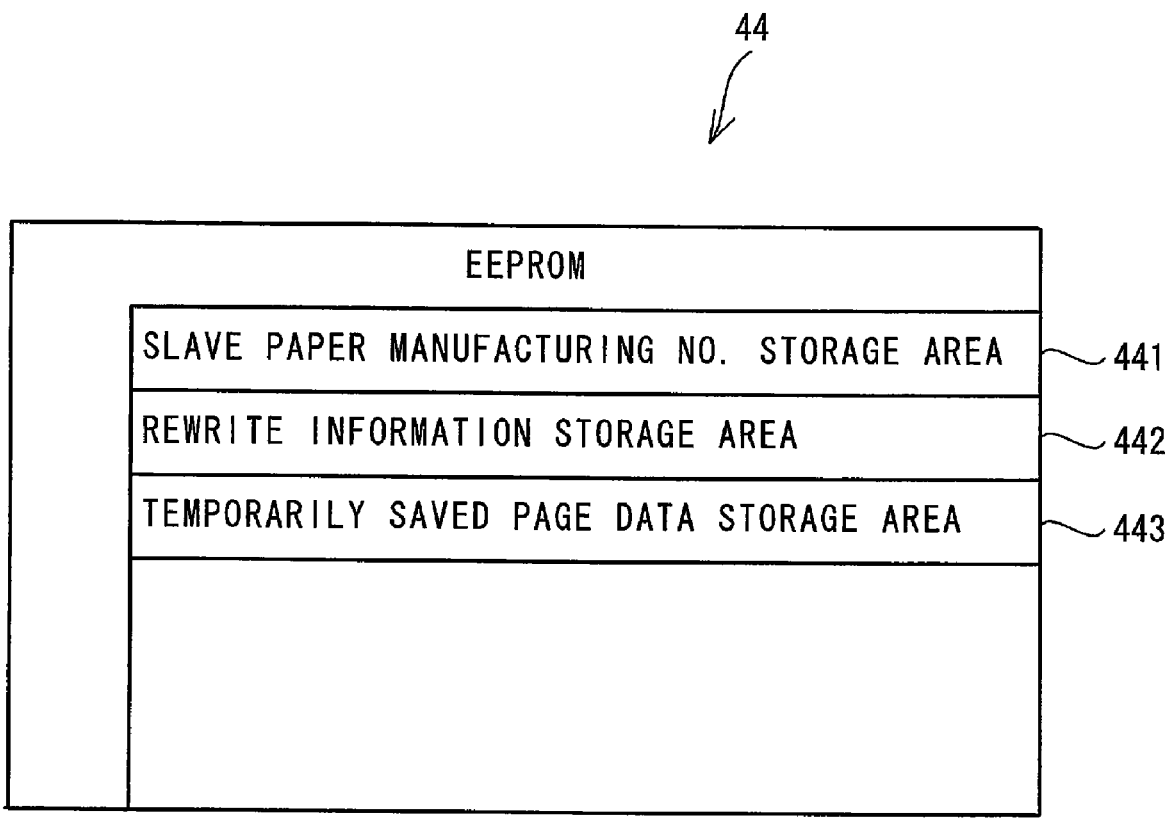
FIG. 8 is a schematic diagram showing data structure of a slave paper EEPROM.

The EEPROM 44 of the slave paper 4 will be explained with reference to FIG. 8. As shown in FIG. 8, the EEPROM 44 includes a slave paper manufacturing number storage area 441, a rewrite information storage area 442, and a temporarily saved page data storage area 443. The slave paper manufacturing number storage area 441 stores the manufacturing number of the slave paper 4. The rewrite information storage area 442 stores rewrite information that indicates whether rewriting of the content being displayed on the display portion 46 of the slave paper 4 is allowed or disallowed. Display data is temporarily saved in the temporarily saved page data storage area 443. The manufacturing number stored in the slave paper manufacturing number storage area 441 is a unique number for each slave paper 4 and is identification information uniquely identifying the slave paper 4 from any other one of the slave papers 4.

The operation of the display device 1 will be explained with reference to FIG. 9 to FIG. 29. First, the main process of the master paper 3 (the master paper main process) will be explained with reference to FIG. 9 and FIG. 10. Next, the main process of the slave paper 4 (the slave paper main process) which is performed upon receipt of a command from the master paper 3, will be explained with reference to FIG. 11 and FIG. 12. Then, with reference to FIG. 13 onwards, an explanation will be given of how the CPU 31 displays a content on consecutive pages when the content have been selected.

Figure 9:
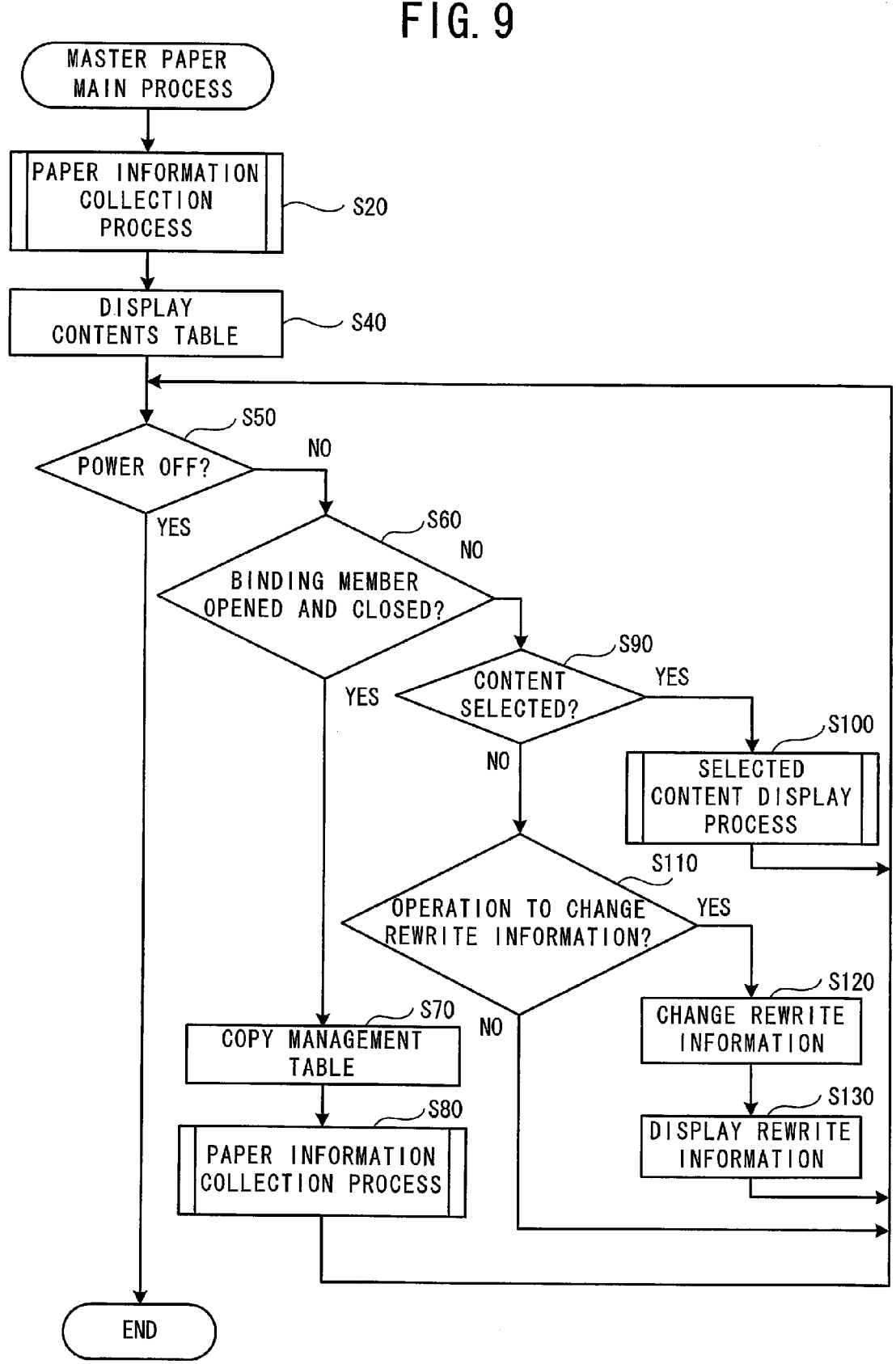
FIG. 9 is a flowchart of a master paper main process.

The master paper main process is started by switching on the power source of the master paper 3 using a power button that is not shown in the figures. As shown in FIG. 9, when the master paper main process starts, the CPU 31 performs a paper information collection process (step S20). The paper information collection process is the process in which paper information, which is information about the electronic papers 5 bound in the display device 1, is collected. The paper information may indicate the respective location positions of the slave papers 4.

Details of the paper information collection process will be explained with reference to FIG. 10. In the paper information collection process, the CPU 31 queries the manufacturing number in the order of the slave papers 4 positioned from 0 to 255, and records the respective location positions of the slave papers 4 in the connected papers management table.

Figure 10:
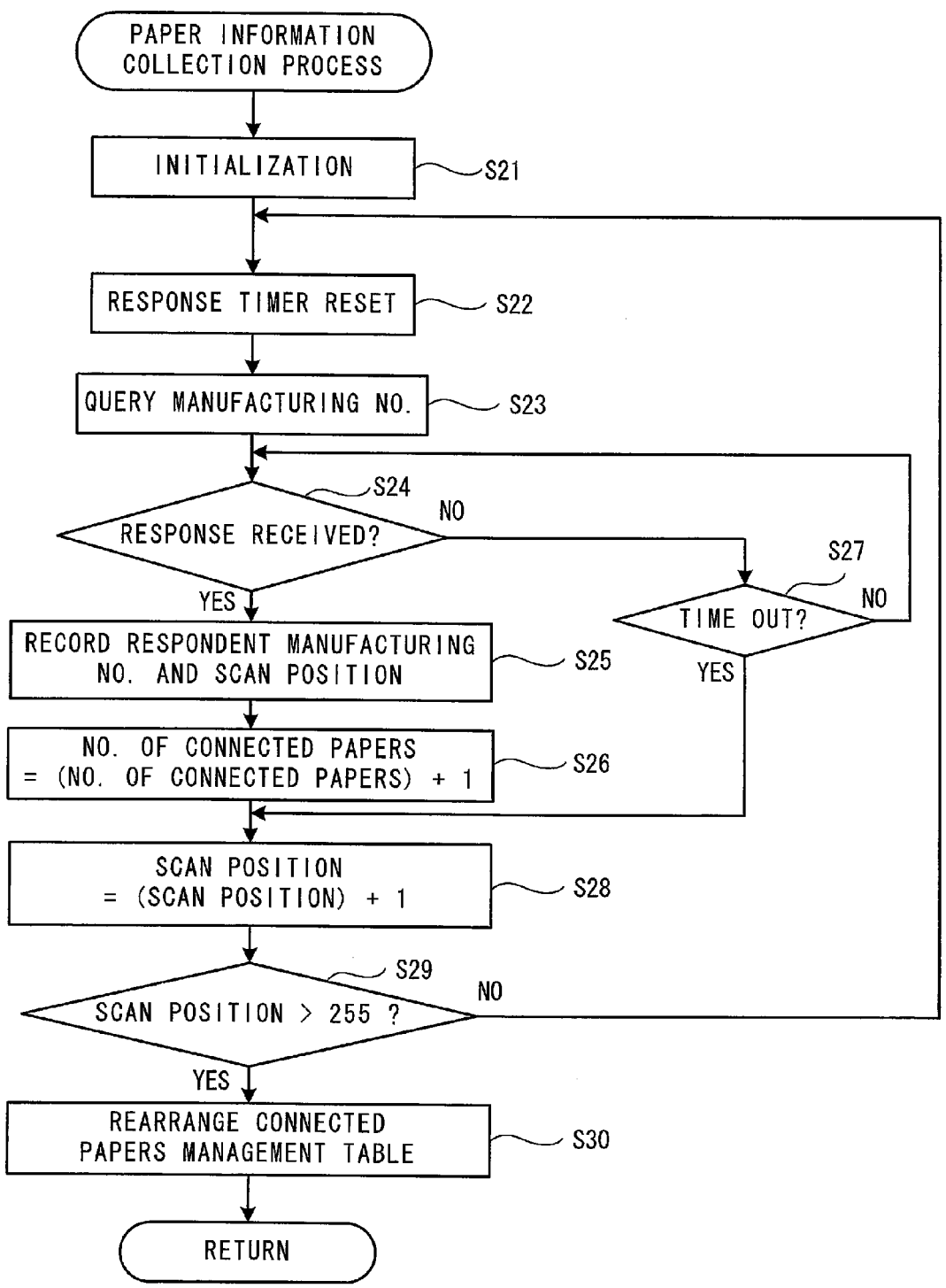
FIG. 10 is a flow chart of a paper information collection process performed as part of the master paper main process.

As shown in FIG. 10, the CPU 31 performs an initialization. Specifically, the CPU 31 sets the scan position to zero. Also, as the master paper 3 is bound to the display device 1, the CPU 31 first records paper information about the master paper 3. More specifically, the CPU 31 records one as the number of connected papers in the number of connected papers storage area 331, and records the manufacturing number of the master paper 3 and position information in the connected papers management table (step S21).

The CPU 31 performs processing to query the manufacturing number of the slave papers 4 in order from the zero scan position. If there is no slave paper 4 in the queried scan position, no response is returned. In that case, the CPU 31 performs a time out. Here, the CPU 31 sets a timer that waits for a response (step S22). The CPU 31 queries the manufacturing number of the slave paper 4 that is possibly in the target scan position (step S23) In the present embodiment, data transmission between the master paper 3 and the slave papers 4 is performed using a format such as: (destination address type, destination address position, destination address manufacturing number, command, data). In step S23, for example, the CPU 31 transmits to the slave paper 4 a command querying the manufacturing number for the zero scan position: (S, 0, *, REQID).

The CPU 31 determines whether or not a response is received from the slave paper 4 in response to the transmitted command (step S24). If a response is received (YES at step S24), the CPU 31 stores the manufacturing number of the respondent slave paper 4 to the paper number 3322 on the connected papers management table and the relevant scan position to the in-ring position 3324 (step S25). The CPU 31 adds one to the number of connected papers (step S26). If no response is received (NO at step S24), the CPU 31 returns to step S24 and repeats the process over a predetermined period of time during which a time out does not occur (NO at step S27). When a time out occurs (YES at step S27), the CPU 31 performs processing for the next scan position (step S28).

When the CPU 31 completes processing for the target scan position (step S26 or YES at step S27), the figure one is added to the current scan position to target the next scan position (step S28). The CPU 31 repeats steps S24 to S29 while processing up to the scan position 255 is not complete (NO at step S29). When processing of all the scan positions is complete (YES at S29), the CPU 31 re-arranges the records in the connected papers management table, using the in-ring position 3324 as the key (step S30). The positions and the manufacturing numbers of all the electronic papers 5 in the display device 1 are collected in the above manner, thus completing the paper information collection process by the CPU 31, which then returns to the master paper main process.

Returning to FIG. 9, the explanation of the master paper main process will be continued. When the paper information collection process is complete (step S20), the CPU 31 displays a table of contents on the master paper 3 (step S40). In the present embodiment, the master paper 3 functions as an index page from which a content can be selected.

When the power source is turned OFF (YES at step S50), the CPU 31 completes processing. If the power source is not turned OFF (NO at step S50), the CPU 31 determines whether or not the binding member 2 has been opened and closed (step S60). As explained above, the opening and closing of the binding member 2 is detected by the switch 148 of the position detection ring 24. If the binding member 2 has been opened and closed (YES at step S60), an electronic paper 5 may have been added or removed. Accordingly, the CPU 31 copies the connected papers management table to the second table storage area 333 as the previous status management table (step S70). The CPU 31 once more performs the paper information collection process (step S80 in FIG. 10) and returns to step S50.

If the binding member 2 has not been opened and closed (NO at step S60), the CPU 31 determines whether or not a content has been selected via the touch panel 30 on the master paper 3 (step S90). If a content has been selected (YES at step S90), the CPU 31 performs a selected content display process to display the selected content on the slave paper 4 (step S100), and returns to step S50. Details of the selected content display process will be explained later with reference to FIG. 13 onwards.

If a content has not been selected (NO at step S90), the CPU 31 determines whether or not there has been any input via the touch panel 30 to change the rewrite information for the master paper 3 (step S110). If there has been an input to change the rewrite information, the rewrite information for the master paper 3 is changed. Namely, if the rewrite information was set to permit rewriting, the setting is changed to inhibit rewriting. If rewrite information was set to inhibit rewriting, the setting is changed to permit rewriting. If the rewrite information is changed (YES at step S110), the CPU 31 changes the rewrite information stored in the rewrite information storage area 342 of the EEPROM 34 (step S120), and displays the result of the change on the display portion 36 (step S130). After that, the CPU 31 returns to step S50. If there has been no input to change the rewrite information (NO at step S110), the CPU 31 returns to step S50. The above process is repeated on the master paper 3 until the power source is turned OFF.

Figure 11:
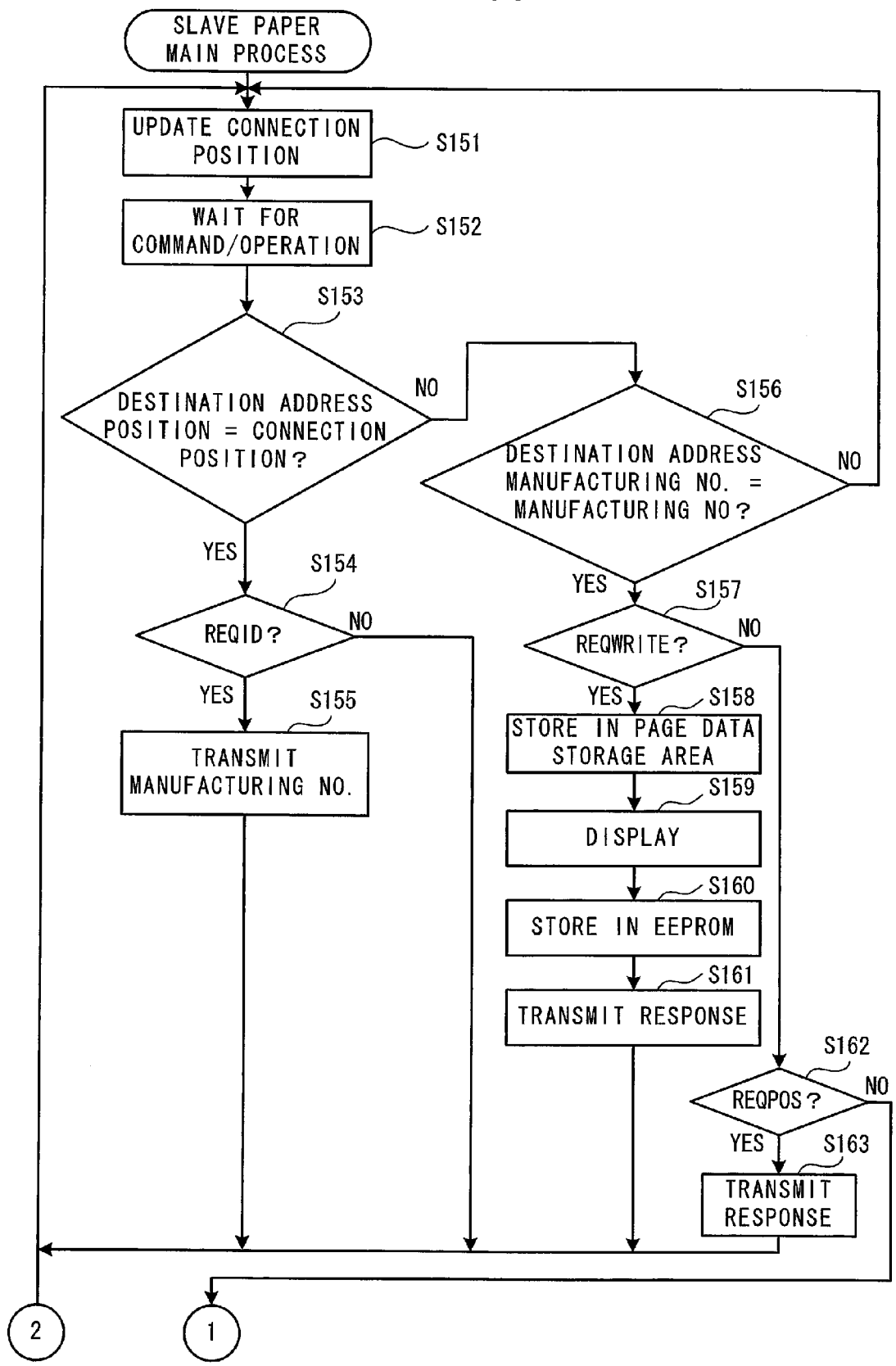
FIG. 11 is one part of a flowchart of a slave paper main process.

The slave paper main process performed on the slave paper 4 will be explained with reference to FIG. 11 and FIG. 12. As shown in FIG. 11, the CPU 41 of the slave paper 4 acquires the output value from the position detection portion 47, updates the connection position of the slave paper 4 and stores the update to the connection position storage area 431 (step S151). For example, for the slave paper 4 with the paper number S00234, the connection position "129" is acquired and stored in the connection position storage area 431. The CPU 41 waits for a command from the master paper 3 or for an operation by the user (step S152).

The CPU 41 of the slave paper 4 determines whether or not the destination address position included in the command received from the master paper 3 is the connection position for the slave paper 4 (the position stored in the connection position storage area 431) (step S153). When the destination address position is the connection position (YES at step S153), the CPU 41 determines whether or not the received command is a command querying the manufacturing number (REQID) (step S154) If the received command is a command querying the manufacturing number (YES at step S154), the CPU 41 responds by transmitting the manufacturing number of the slave paper 4 stored in the slave paper manufacturing number storage area 441 in the EEPROM 44 to the master paper 3 (step S155). In the present embodiment, the transmitted response is (M, *, *, SENDID, manufacturing number). If the received command is not a command querying the manufacturing number (NO at step S154), the CPU 41 returns to step S151.

For example, for the slave paper 4 numbered "S00234," if the destination address position included in the received command is "129", (YES at step S153), and the received command is a REQID command (YES at step S154), (M, *, *, SENDID, S00234) is transmitted to the master paper 3.

When the destination address position is not the connection position (NO at step S153), the CPU 41 of the slave paper 4 determines whether or not the destination address manufacturing number included in the command is the manufacturing number of the slave paper 4 (step S156). If the destination address manufacturing number is not the manufacturing number of the slave paper 4 (NO at step S156), the CPU 41 returns to step S151.

When the destination address manufacturing number is the manufacturing number of the slave paper 4 (YES at step S156), the CPU 41 determines whether or not the received command is a command to write the display image (REQWRITE) (step S157). If the received command is a command to write the display image (YES at step S157), the CPU 41 writes the display data received with the command to the page data storage area 433 (step S158), and displays the developed display data on the display portion 46 (step S159). The CPU 41 stores the display data (page data) written in the page data storage area 433 to the temporarily saved page data storage area 443 (step S160), and responds to the master paper 3 indicating that the display is complete (step S161). Then, the CPU 41 returns to step S151. In the present embodiment, the transmitted response is (M, *, *, SENDDONE, NULL). The page data stored in the temporarily saved page data storage area 443 may be used to restore the original display content after page data is temporarily rewritten or after the display content is moved to another page if the slave paper 4 is rewrite-inhibited.

If the received command is not a command to write the display image (REQWRITE) (NO at step S157), the CPU 41 determines whether or not the received command is a command querying position information (REQPOS) (step S162). If the received command is a command querying position information (YES at step S162), the CPU 41 acquires the position information stored in the connection position storage area 431 and responds to the master paper 3 (step S163). In the present embodiment, the transmitted response is (M, *, *, SENDPOS, connection position). The CPU 41 then returns to step S151.

Figure 12:
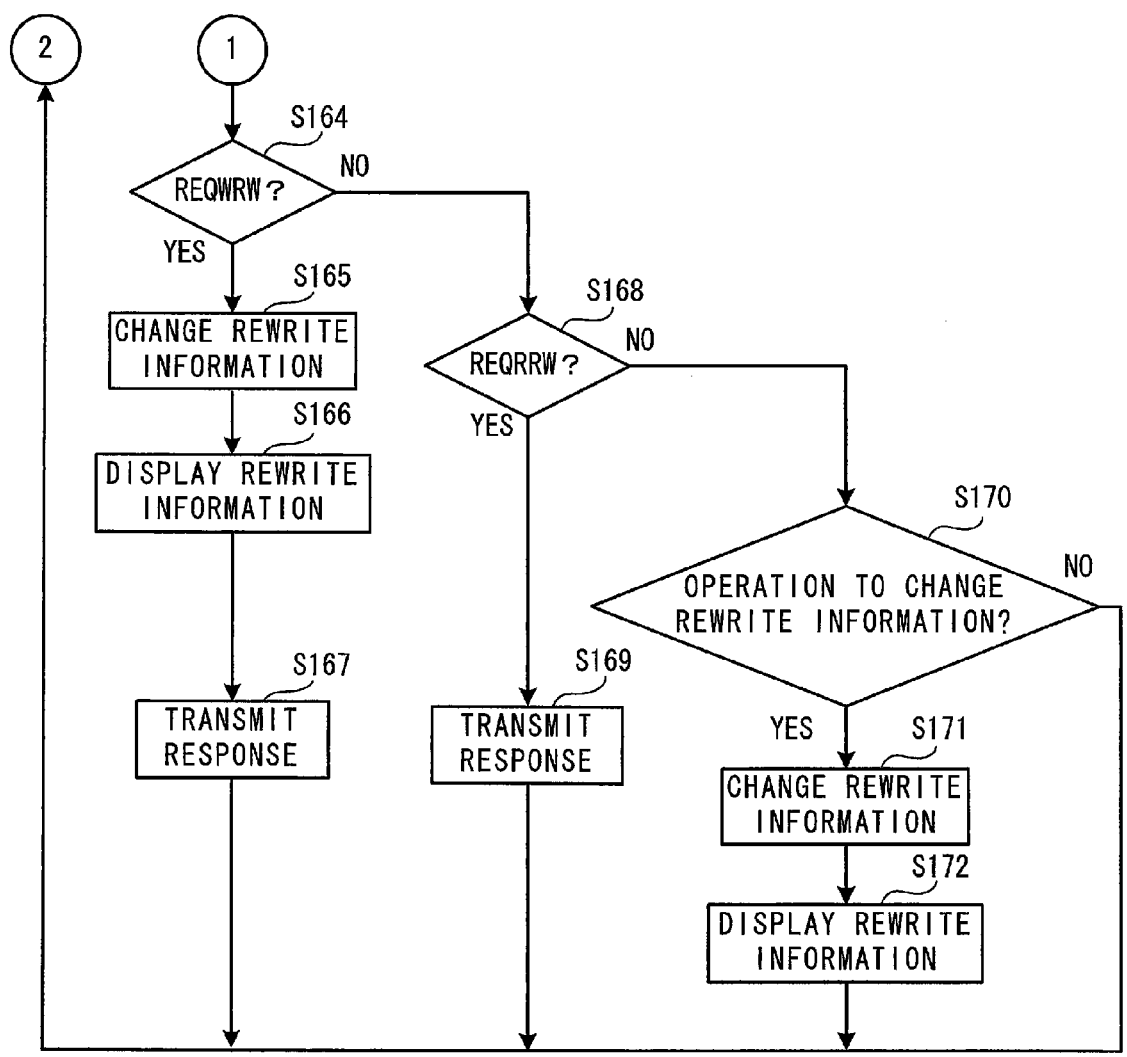
FIG. 12 is the other part of the flowchart of the slave paper main process.

If the received command is not a command querying position information (REQPOS) (NO at step S162), the CPU 41 determines whether or not the received command is a command to change the rewrite information for the slave paper 4 (REQWRW) (step S164), as shown in FIG. 12. If the received command is a command to change the rewrite information (YES at step S164), the CPU 41 changes the rewrite information stored in the rewrite information storage area 442 of the EEPROM 44. Namely, the CPU 41 changes a rewrite permit setting to a rewrite inhibit setting or changes a rewrite inhibit setting to a rewrite permit setting (step S165). The CPU 41 displays the updated rewrite information on the display portion 46 (step S166), and responds to the master paper 3 indicating that the instructed process (the rewrite information update) is complete (step S167). In the present embodiment, the transmitted response is (M, *, *, SENDDONE, NULL). The CPU 41 then returns to step S151 in FIG. 11.

As shown in FIG. 12, if the received command is not a command to change the rewrite information (REQWRW) (NO at step S164), the CPU 41 determines whether or not the received command is a command querying the rewrite information for the slave paper 4 (REQRRW) (step S168). If the received command is a command querying the rewrite information (YES at step S168), the CPU 41 acquires the rewrite information stored in the rewrite information storage area 442 of the EEPROM 44 and responds to the master paper 3 (step S169). In the present embodiment, the transmitted response is (M, *, *, SENDRW, rewrite information).

If the received command is not a command querying the rewrite information (NO at step S168), the CPU 41 determines whether or not there has been any input via the touch panel 40 of the slave paper 4 to change the rewrite information (step S170). If there has been an input to change the rewrite information, the rewrite information for the slave paper 4 is changed. Namely, if the rewrite information for the slave paper 4 was set to permit rewriting, the setting is changed to inhibit rewriting. If the rewrite information for the slave paper 4 was set to inhibit rewriting, the setting is changed to permit rewriting. If an input to change the rewrite information has been inputted (YES at step S170), the CPU 41 changes the rewrite information stored in the rewrite information storage area 442 of the EEPROM 44 (step S171) and displays the result of the change on the display portion 46 (step S172). The CPU 41 then returns to step S151 in FIG. 11.

In the above manner, the CPU 41 of the slave paper 4 updates the connection position, and waits for a command from the master paper 3. In accordance with the received command, the CPU 41 updates the display content on the display portion 46, changes the rewrite information for the slave paper 4, and transmits the manufacturing number of the slave paper 4 or the rewrite information for the slave paper 4 to the master paper 3. The CPU 41 also changes the rewrite information for the slave paper 4 in accordance with an operation by the user.

The process to display a selected content on consecutive papers when there is a rewrite-inhibited electronic papers 5 will be explained with reference to FIG. 13 to FIG. 29. A first embodiment to a third embodiment will be explained as methods of displaying the selected content, while a fourth embodiment is a combination of the first to third embodiments. The selected content display process will be explained in detail with reference to FIG. 13 and FIG. 14. The selected content display process is performed in step S100 of the master paper main process (see FIG. 9), and, excluding a modified example, it is the same process in the first to third embodiments.

Figure 13:
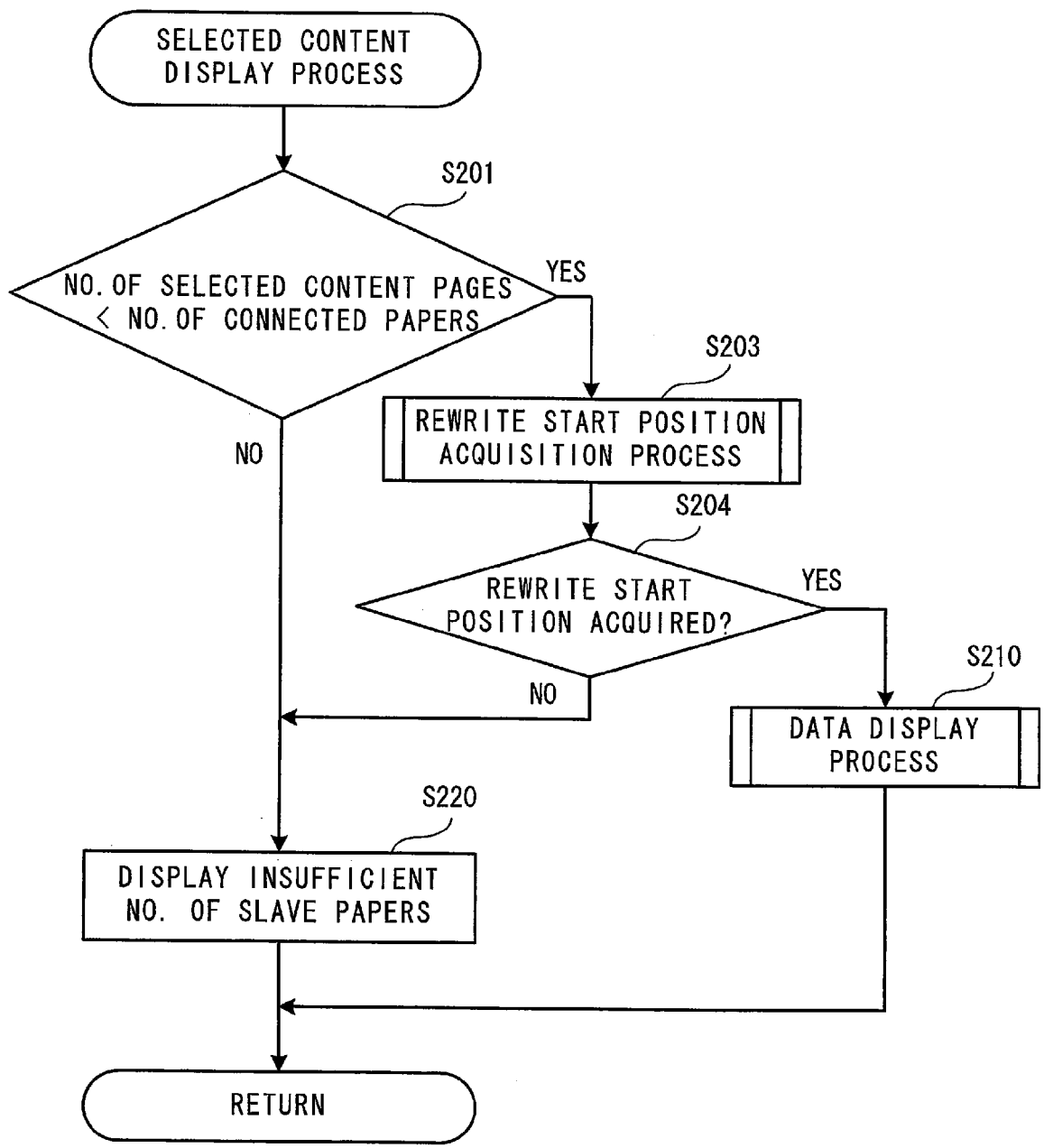
FIG. 13 is a flowchart of a selected content display process performed as part of the master paper main process.

As shown in FIG. 13, when the selected content display process (see step S100 in FIG. 9) is started, the CPU 31 determines whether or not the number of pages for the content selected via the touch panel 30 is less than the number of connected papers (step S201). The CPU 31 makes this determination by referring to a number of selected content pages stored in the memory card 37 and the number of connected papers stored in the number of connected papers storage area 331 of the RAM 33.

In the present embodiment, all the pages of the selected content are displayed on the slave papers 4. Accordingly, when there are five or more pages of a selected content, which are equal to or more than the number of a connected papers (five) (NO at step S201), the CPU 31 displays a message on the display portion 36 of the master paper 3 indicating that there is an insufficient number of slave papers 4 necessary to display the selected content (step S220), and returns to the master paper main process without displaying the content. With the display device 1 of the present embodiment, the number of slave papers 4 can be changed as appropriate. Therefore, if the user adds a sufficient number of the slave papers 4 to display the content and re-selects the content, the content can be displayed and the user can view the content.

If the number of selected content pages is less than the number of connected papers (YES at step S201), the CPU 31 performs a rewrite start position acquisition process that determines the first slave paper 4 on which the selected content 1 is displayed (step S203). In the present embodiment, the selected content is always consecutively displayed. Therefore, in the rewrite start position acquisition process, the CPU 31 searches for a location in which there are a consecutive number of the slave papers 4 that match the number of selected content pages, or temporarily creates such a location, and acquires the rewrite start position (the page number of the slave paper 4 on which the first page of the selected content is displayed). The rewrite start position acquisition process has three main embodiments, which will be explained in detail later.

After the rewrite start position acquisition process is complete, the CPU 31 determines whether or not the rewrite start position has been acquired. In other words, the CPU 31 determines whether or not consecutive pages have been secured to display the selected content (step S204). The rewrite start position is acquired as the "startpos" in the rewrite start position acquisition process. If the rewrite start position is not acquired (NO at step S204), the selected content cannot be displayed on consecutive pages. Therefore, the CPU 31 displays a message on the display portion 36 of the master paper 3 indicating that there is an insufficient number of slave papers 4 necessary to display the selected content (step S220), and returns to the master paper main process without displaying the content.

If the rewrite start position is acquired (YES at step S204), the CPU 31 performs a data display process by which the selected content is displayed on the consecutive slave papers 4 starting from the slave paper 4 that is in the acquired rewrite start position (step S210). The data display process will be explained in detail with reference to FIG. 14. Here, an example will be explained when the rewrite start position "startpos" is "2," and the number of selected content pages is four.

Figure 14:
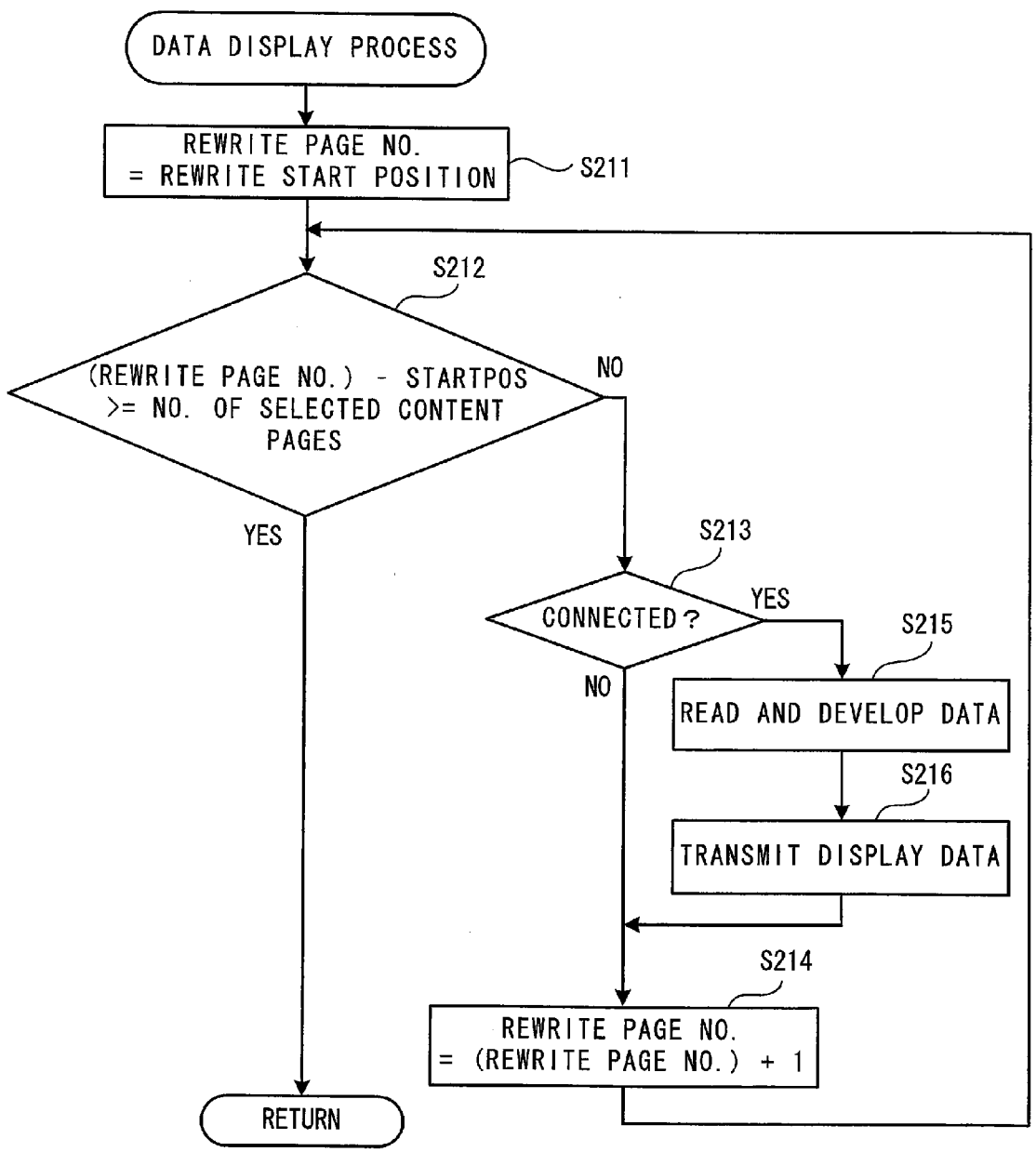
FIG. 14 is a flowchart of a data display process performed as part of the selected content display process.

As shown in FIG. 14, the CPU 31 sets the rewrite start position "startpos" acquired in the rewrite start position acquisition process as a rewrite page number (step S211). The rewrite page number is the page number of the slave paper 4 on which the display content is to be rewritten. Here, the rewrite page number is set as "2." The CPU 31 determines whether or not the value of the rewrite page number minus the rewrite start position "startpos" is equal to or greater than the number of selected content pages (step S212). When this process is performed for the first time, the rewrite page number and the rewrite start position "startpos" value are the same, and therefore the difference between the rewrite page number and the rewrite start position is "0." The number of selected content pages is four (NO at step S212).

This means that the display process is not yet complete for all the pages. The CPU 31 refers to the connected papers management table and determines whether or not the connection status of the slave paper 4 corresponding to the rewrite page number (hereinafter sometimes referred to as the "rewrite page paper") is "connected" (step S213). If the rewrite page paper is not connected to the binding member 2 (NO at step S213), the CPU 31 cannot write on the slave paper 4. The CPU 31 therefore adds one to the rewrite page number (step S214), and returns to step S212 to perform the writing process for the slave paper 4 in the next position.

As shown in FIG. 6, the slave paper 4 "S00234" that corresponds to the rewrite page number "2" is connected to the binding member 2 (YES at step S213), and the CPU 31 reads the rewrite page number content data from the memory card 37, develops the data into the display data, and stores the developed display data in the page data storage area 334 (step S215). The CPU 31 transmits the display data addressed to the slave paper 4 manufacturing number "S00234" that corresponds to the rewrite page number "2." In this example, the transmitted data is (S,*, "S00234", REQWRITE, "display data") As explained above, the slave paper 4 that receives this command displays the received display data on the display portion 46 of the slave paper 4, and notifies the master paper 3 that display is complete. Therefore, the CPU 31 stands by until a response is received from the slave paper 4 (step S216). The process to display the display data for one page is completed by the processes in step S215 and step S216, so the CPU 31 adds one to the rewrite page number to obtain "3" (step S214), and returns to step S212 to perform the writing process for the slave paper 4 in the next position.

When the process is performed for the second time, the difference between the rewrite page number ("3") and the rewrite start position ("2") is "1," and the difference is still smaller than the number of selected content pages (four) (NO at step S212). The CPU 31 performs the display process for the next slave paper 4 ("S04058") (step S213 to step S216), adds one to the rewrite page number to obtain "4" (step S214) and returns to step S212.

When the process is performed for the third time, the difference between the rewrite page number ("4") and the rewrite start position ("2") is "2," and the difference is still smaller than the number of selected content pages (four) (NO at step S212). The CPU 31 performs the display process for the next slave paper 4 ("S03741") (step S213 to step S216), adds one to the rewrite page number to obtain "5" (step S214) and returns to step S212.

When the process is performed for the fourth time, the difference between the rewrite page number ("5") and there write start position ("2") is "3," and the difference is still smaller than the number of selected content pages (four) (NO at step S212). The CPU 31 performs the display process for the next slave paper 4 ("S08507") (step S213 to step S216), adds one to the rewrite page number to obtain "6" (step S214) and returns to step S212.

When the process is performed for the fifth time, the difference between the rewrite page number ("6") minus the rewrite start position ("2") is "4," and the difference has reached the number of selected content pages (four) (YES at step S212). In other words, all the selected content pages have been displayed, so the CPU 31 returns to the selected content display-process (FIG. 13), and further returns to the master paper main process (FIG. 9).

As explained above with reference to FIG. 13 and FIG. 14, in the above-described embodiment, the CPU 31 performs the data display process after the rewrite start position acquisition process. Before performing the rewrite start position acquisition process, the CPU 31 may also move in advance the display content of the slave paper 4 that is set to inhibit rewriting (hereinafter sometimes referred to as the "rewrite-inhibited paper") to a later position. This type of modified example will be explained in detail with reference to FIG. 15 and FIG. 16.

Figure 15:
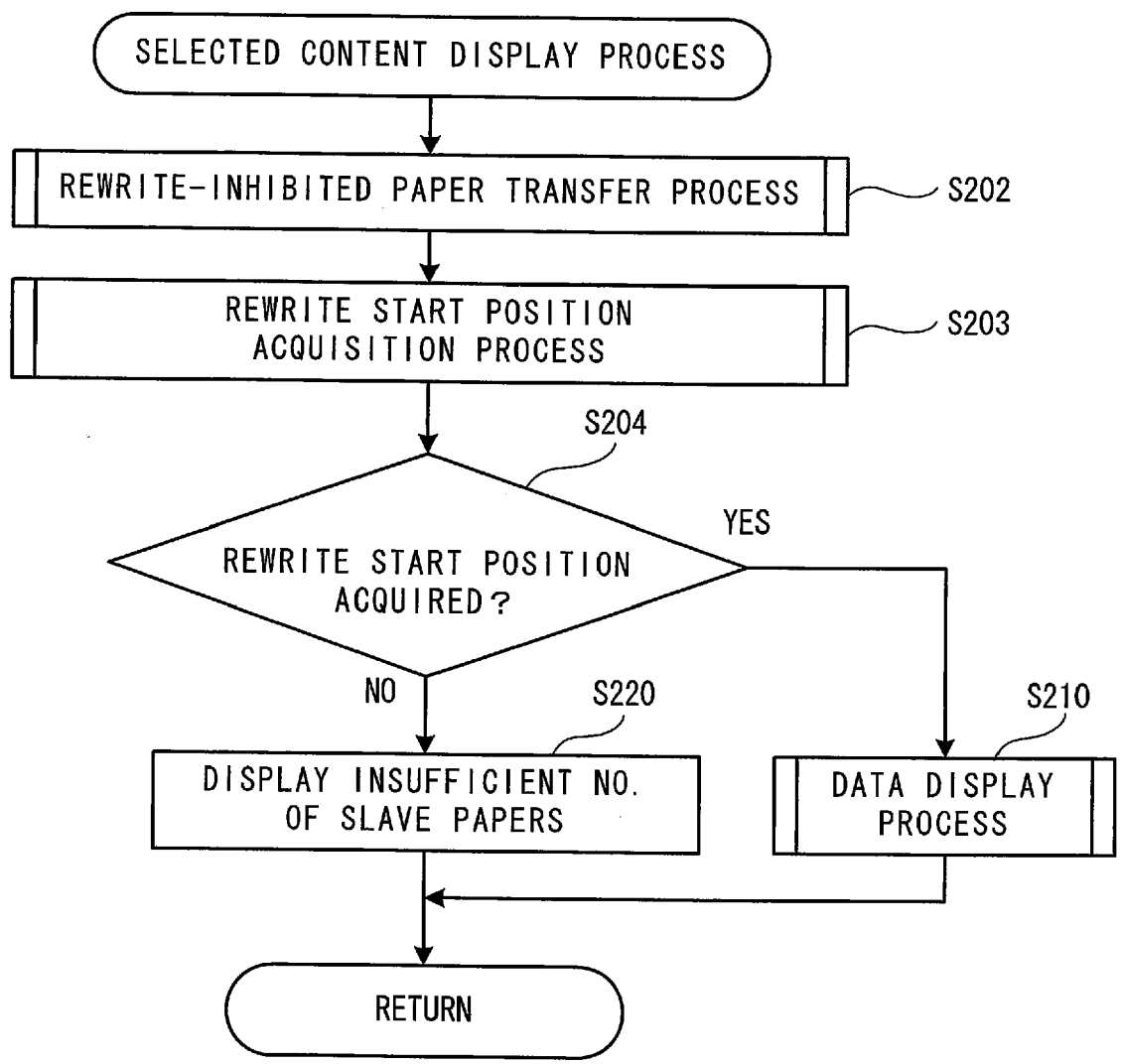
FIG. 15 is a flowchart of a modified example of the selected content display process.

As shown in FIG. 15, when a modified example of the selected content display process is started, the CPU 31 first performs a process to transfer the rewrite-inhibited paper (step S202). The rewrite-inhibited paper transfer process will be explained in detail with reference to FIG. 16.

Figure 16:
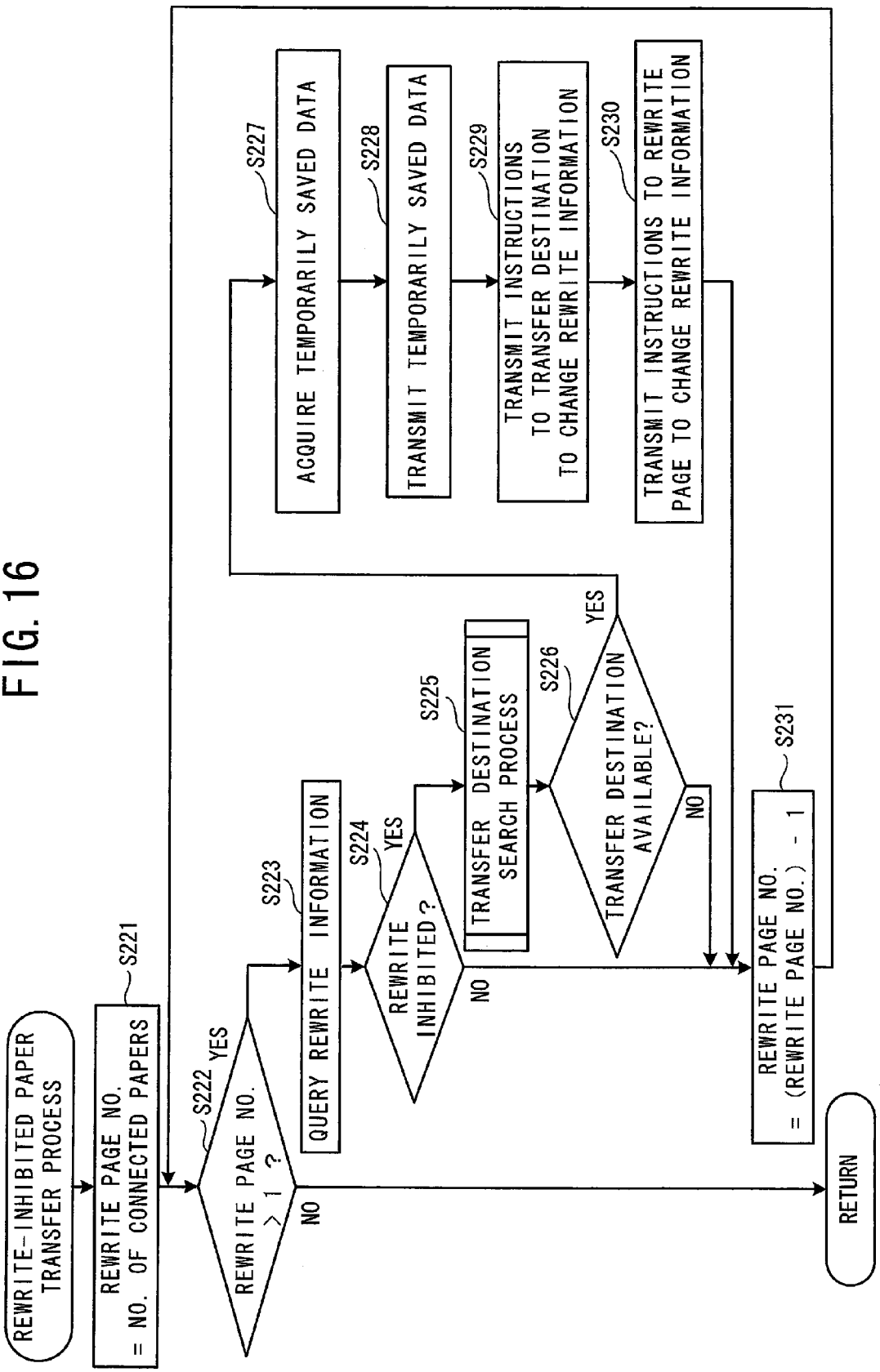
FIG. 16 is a flowchart of a rewrite-inhibited paper transfer process performed as part of the modified example of the selected content display process.

As shown in FIG. 16, when the rewrite-inhibited paper transfer process is started, the CPU 31 sets the number of connected papers stored in the number of connected papers storage area 331 as the rewrite page number (step S221). By doing this, processing is performed in a reverse direction from the very last paper. In the present embodiment, the number of connected papers is five, as shown in FIG. 6, and the rewrite page number is set as "5."

If the rewrite page number exceeds "1," (YES at step S222), the CPU 31 transmits a command (REQRRW) querying the rewrite information to the slave paper 4 corresponding to the rewrite page number, and waits for a response from the slave paper 4. For example, when the process is first performed, the command is transmitted to the slave paper 4 "S08507" that corresponds to the rewrite page number "5" (step S223). In the present embodiment, the transmitted command is (S, *, "rewrite page paper manufacturing number", REQRRW).

The CPU 31 acquires the rewrite information from the content of the received response, and determines as a result whether or not the slave paper 4 permits rewriting (step S224). If the slave paper 4 permits rewriting (NO at step S224), there is no need to transfer the display content. The CPU 31 therefore subtracts one from the rewrite page number (step S231) in order to process the next slave paper 4. Here, if the slave paper 4 with the page number "5" permits rewriting, the next rewrite page number is "4" and the CPU 31 returns to step S222.

If the rewrite page paper does not permit rewriting (YES at step S224), the CPU 31, in order to transfer the display content of that page, performs a process to search for a transfer destination (step S225). The transfer destination search process will be explained with reference to FIG. 26, assuming that the slave paper 4 with the page number "4" does not permit rewriting. The transfer destination search process is also performed as part of the rewrite start position acquisition process according to the third embodiment that will be explained later.

Figure 26:
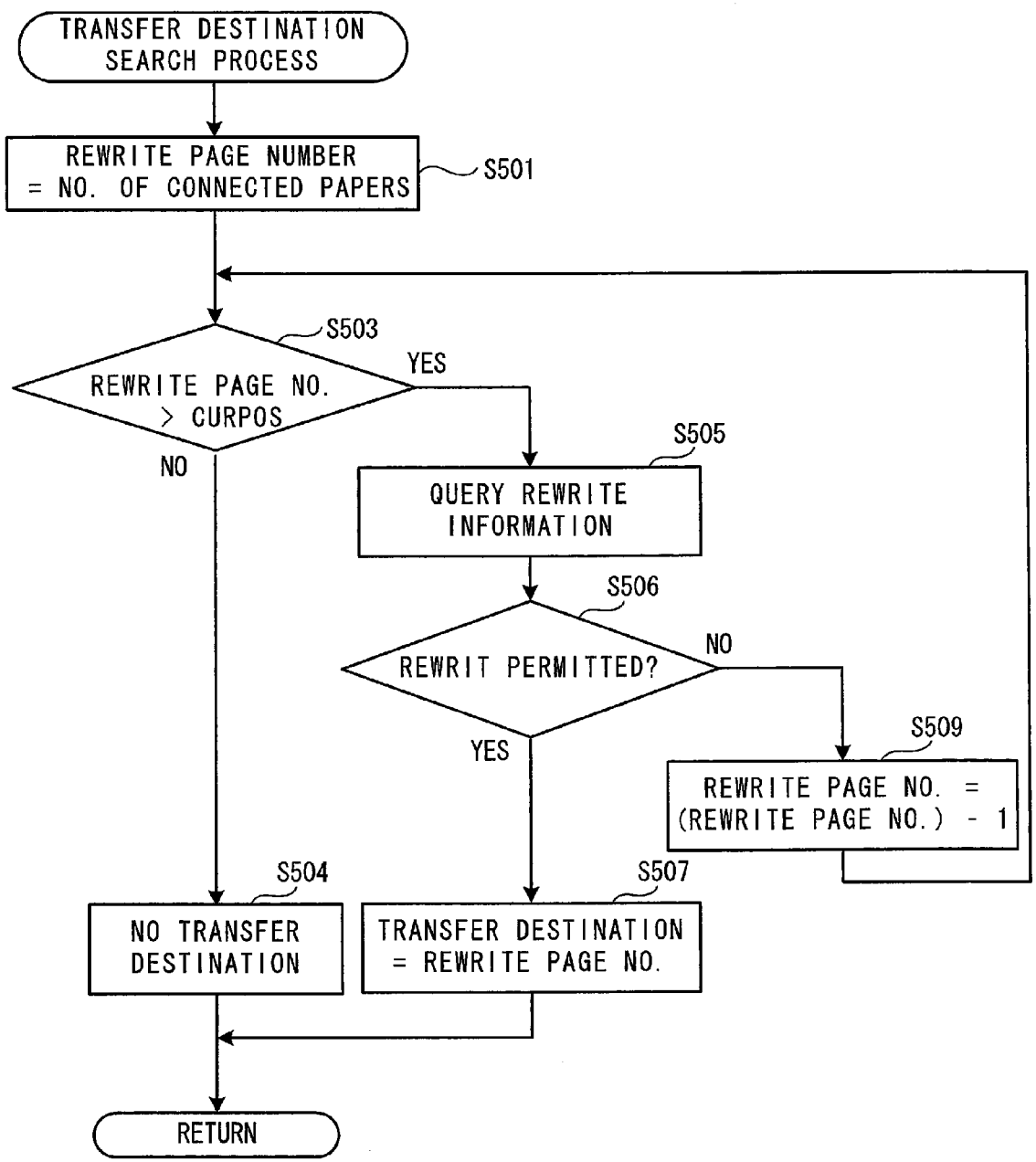
FIG. 26 is a flowchart of a transfer destination search process.

As shown in FIG. 26, in the transfer destination search process, the CPU 31 sets the number of connected papers stored in the number of connected papers storage area 331 as the rewrite page number (step S501). Therefore, when the process is performed for the first time, the rewrite page number is set as "5." The CPU 31 determines whether or not the value of the rewrite page number is greater than the page number (curpos) of the slave paper 4 that is to be transferred (step S503). In other words, the CPU 31 determines whether or not there is another one of the slave papers 4 in a later position than the slave paper 4 that is to be transferred. In this example, the page number (curpos) for the slave paper 4 that is to be transferred is "4." When the process is performed for the first time, the value of the rewrite page number is "5," and is therefore greater than the curpos (YES at step S503). Here, the CPU 31 transmits a command querying the rewrite information (REQRRW) for the rewrite page paper (here, "S08507") and waits for a response from the slave paper 4 (step S505). In this example, the transmitted command is (S, *, "S08507", REQRRW).

The CPU 31 acquires the rewrite information from the content of the received response, and determines as a result whether or not the slave paper 4 permits rewriting (step S506). If the slave paper 4 permits rewriting (YES at step S506), the display content can be transferred to the slave paper 4, and so the slave paper 4 is determined as the transfer destination. Specifically, the CPU 31 sets the rewrite page number value as the transfer destination "forwardpos" (step S507), and returns to the rewrite-inhibited paper transfer process shown in FIG. 16. Here, the "forwardpos" is set as "5." If the slave paper 4 does not permit rewriting (NO at step S506), the display content cannot be transferred to the slave paper 4. Therefore, in order to check whether the content can be transferred to the slave paper 4 in the immediately preceding position, the CPU 31 subtracts one from the rewrite page number (step S509) and returns to step S503.

For example, in the above example, when the slave paper 4 with the page number "5" does not permit rewriting, when the process is performed for the second time, the rewrite page number becomes "4." As the page number (the curpos) for the slave paper 4 to be transferred is also "4," the rewrite page number value is equal to or less than the slave paper 4 page number (the curpos), and the CPU 31 cannot transfer the display content (NO at step S503). There is therefore no destination to which the slave paper 4 can be transferred, and the CPU 31 sets the transfer destination "forwardpos" as "null," does not set a value (step S504) and returns to the rewrite-inhibited paper transfer process shown in FIG. 16.

Returning to FIG. 16, when the transfer destination "forwardpos" has been set by the transfer destination search process (YES at step S226), the CPU 31 acquires the temporarily saved page data stored in the temporarily saved page data storage area 443 in the EEPROM 44 of the rewrite page paper (step S227). The CPU 31 transmits the temporarily saved page data along with a command to display the temporarily saved page data to the transfer destination slave paper 4 (hereinafter referred to as the "transfer destination paper"), then waits for a response from the transfer destination paper (step S228). Here, the transmitted command is (S, *, "paper manufacturing number corresponding to forwardpos.", REQWRITE, page data). In the above example, the data on the slave paper 4 (S03741) with the page number "4" is transmitted to the slave paper 4 (S08507) with the page number "5".

The CPU 31 transmits a command to change the setting of the transfer destination paper to inhibit rewriting, and waits for a response from the transfer destination paper (step S229). Here, the transmitted command is (S, *, "paper manufacturing number corresponding to forwardpos", REQWRW). In the above example, the command to change the rewrite information is sent to the transfer destination paper, namely to the slave paper 4 (S08507) with the page number "5".

The CPU 31 transmits a command to change the setting to permit rewriting of the rewrite page paper and waits for a response from the rewrite page paper (step S230). Here, the transmitted command is (S, *, "rewrite page paper manufacturing number", REQWRW). In the above example, the command to change the rewrite information is transmitted to the slave paper 4 (S03741) with the page number "4" corresponding to the rewrite page number.

Through the above process, the display content of the rewrite-inhibited rewrite page paper is transferred, and the rewrite page paper is set to be rewrite-permitted, while the transfer destination paper is set to be rewrite-inhibited. The CPU 31 subtracts one from the rewrite page number (step S231), and returns to step S222 in order to process the next slave paper 4. By repeating the above process until the rewrite page number becomes "2" (YES at step S222), the CPU 31 transfers the display content of the rewrite-inhibited pages to a later position in the display device 1.

When the rewrite page number is "1" (NO at step S222), the CPU 31 returns to the modified example of the selected content display process shown in FIG. 15. The CPU 31 performs the rewrite start position acquisition process (step S203). If the rewrite start position is acquired (YES at step S204), the CPU 31 performs the data display process and displays the selected content on the slave paper 4 (step S210). If the rewrite start position is not acquired (NO at step S204), the CPU 31 displays a message on the display portion 36 of the master paper 3 indicating that there are insufficient slave papers 4 necessary to display the selected content (step S220), and returns to the master paper main process (FIG. 9) without displaying the content.

The three embodiments for the rewrite start position acquisition process performed as part of the above-described selected content display process will be explained in order. First, the first embodiment of the rewrite start position acquisition process will be explained with reference to FIG. 17 to FIG. 19, in which the setting of the rewrite-inhibited slave paper 4 is temporarily changed to permit rewriting and the selected content is displayed.

Figure 17:
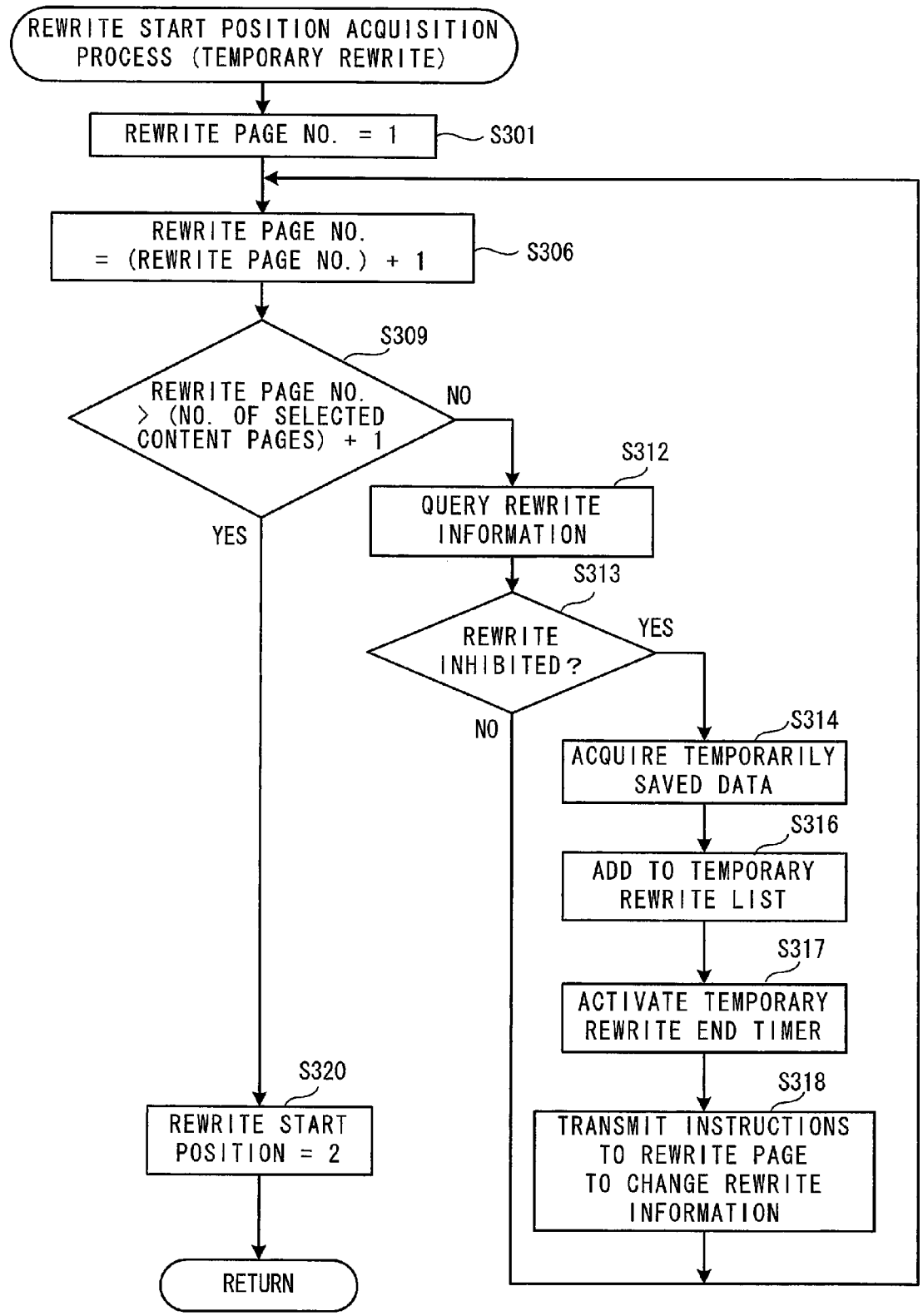
FIG. 17 is a flowchart of a rewrite start position acquisition process according to a first embodiment, performed as part of the selected content display process.

As shown in FIG. 17, when the rewrite start position acquisition process according to the first embodiment is started, the CPU 31 sets the rewrite page number as "1" as an initial setting (step S301). The CPU 31 adds one to the rewrite page number (step S306) and then determines whether or not the rewrite page number is greater than the number of selected content pages plus one (step S309). In this example, the number of selected content pages is four.

If the rewrite page number does not exceed the number of selected content pages plus one (NO at step S309), the CPU 31 transmits a command (REQRRW) querying the rewrite information to the rewrite page paper, and waits to receive a response from the slave paper 4 (step S312). In the present embodiment, the transmitted command is (S, *, "rewrite page paper manufacturing number," REQRRW). When the process is performed for the first time, the rewrite page number is "2", and is smaller than the number of selected content pages (four) (NO at step S309). Then, the command □NREQRRW□ is transmitted to the slave paper 4 (S00234) with the page number "2." In this example, rewriting of the slave paper 4 (S00234) with the page number "2" is inhibited.

Figure 18:
FIG. 18 is a schematic diagram showing data structure of a temporary rewrite list used in the rewrite start position acquisition process according to the first embodiment.

The CPU 31 acquires the rewrite information from the content of the received response, and determines as a result whether or not the slave paper 4 permits rewriting (step S313). If the slave paper 4 does not permit rewriting (YES at step S313), in order for the CPU 31 to temporarily permit rewriting of the slave paper 4 and rewrite the display content, the CPU 31 acquires the temporarily saved page data stored in the temporarily saved page data storage area 443 of the EEPROM 44 in the slave paper 4 (step S314). As shown in FIG. 18, the CPU 31 stores the rewrite page number, the page data and a temporary rewrite start time into the temporary rewrite list storage area 337 provided in the RAM 33 (step S316).

As shown in FIG. 18, the temporary rewrite list stores items, including the page number, the page data and the temporary rewrite start time, relating to the slave paper 4 that is originally rewrite-inhibited but temporarily permits rewriting and displays other display content. These data form a single record for each slave paper 4, and each record is assigned a temporary rewrite ID. These data are used when the CPU 31 resets the temporary rewrite and restores the original display content to the original slave paper 4. For example, in the example of the temporary rewrite list shown in FIG. 18, the record in the first row records that originally the second page of "Content A" was displayed on the slave paper 4 with the page number "2" and the slave paper 4 was set to inhibit rewriting. However, a temporary rewrite is recorded as starting at 12:00 on Apr. 28, 2006.

The CPU 31 activates a timer to perform a temporary rewrite end timer event after a predetermined period of time (step S317). The CPU 31 conveys to the timer the temporary rewrite ID assigned when the information relating to the slave paper 4 that is to be temporarily rewritten in this instance is added to the temporary rewrite list (in the example shown in FIG. 18, the temporary rewrite ID for the example in the first row is "1"). When the time limit set on the timer is reached and the temporary rewrite end timer event is performed, the original display content is restored on the slave paper 4 on which the temporary rewrite has been performed in this instance.

Figure 19:
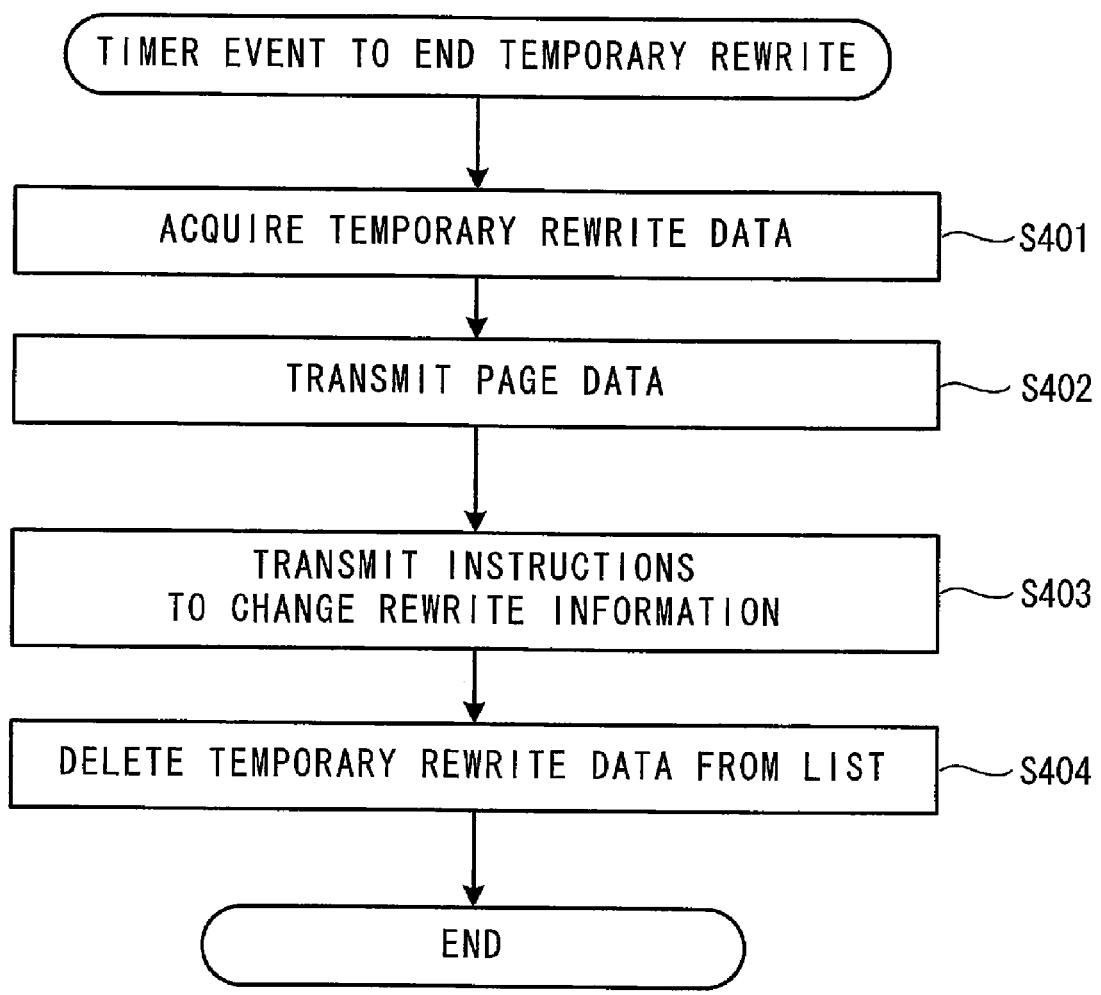
FIG. 19 is a flowchart of a timer event activated by the rewrite start position acquisition process according to the first embodiment.

The temporary rewrite end timer event will be explained with reference to FIG. 19. As shown in FIG. 19, the CPU 31 acquires the temporary rewrite ID conveyed to the timer, and acquires from the temporary rewrite list the temporary rewrite data for the ID (the page number and the page data) (step S401). For example, for the temporary rewrite ID "1" conveyed to the timer, with the temporary rewrite list status shown in FIG. 18, the CPU 31 acquires the page number "2" and the page data of the second page of the "Content A." The CPU 31 transmits a command to display the acquired page data on the slave paper 4 with the acquired page number (here, the slave paper 4 "S00234" with the page number "2"), and at the same time transmits the data, then waits to receive a response from the slave paper 4 with the acquired page number (step S402). Here, the transmitted command is (S, *, "paper manufacturing number corresponding to page number," REQWRITE, page data).

The CPU 31 transmits to the slave paper 4 on which the original display content has been restored a command to return the setting of the slave paper 4 to rewrite-inhibit and waits to receive a response from the slave paper 4 (step S403). Here, the transmitted command is (S, *, "paper manufacturing number corresponding to page number," REQWRW). The CPU 31 deletes the temporary rewrite data (record) for the ID conveyed to the timer from the temporary rewrite list (step S404) and the temporary rewrite end timer event ends.

The explanation of the process will be continued, returning to FIG. 17. After the CPU 31 has activated the timer (step S317), the CPU 31 transmits to the slave paper 4 (here S00234) corresponding to the rewrite page number (here, "2") a command to change the rewrite information for the slave paper 4 to a rewrite-permit setting, and waits to receive a response from the slave paper 4 (step S318). Here, the transmitted command is (S, *, "rewrite page paper manufacturing number," REQWRW). The CPU 31 returns to step S306, adds one to the rewrite page number and performs processing for the slave paper 4 corresponding to the next page.

When the process is performed for the second time, the rewrite page number is "3" (step S306) and is less than the number of selected content pages (four) plus one (five) (NO at step S309). The CPU 31 checks the rewrite information for the slave paper 4 corresponding to the rewrite page number "3" (step S312 and step S313). If rewriting of the slave paper 4 is permitted (NO at step S313), the CPU 31 returns to step S306, adds one to the rewrite page number and performs processing for the slave paper 4 corresponding to the next page.

Here, it is assumed that rewriting of the slave papers 4 corresponding to pages "3" to "15" is permitted. When the process is performed for the third time, the rewrite page number is "4" (step S306), and is less than the number of selected content pages (four) plus one (five) (NO at step S309). The CPU 31 checks the rewrite information for the slave paper 4 corresponding to the rewrite page number "4" (step S312 and step S313). As rewriting of the slave paper 4 is permitted (NO at step S313), the CPU 31 returns to step S306, adds one to the rewrite page number and performs processing for the slave paper 4 corresponding to the next page.

When the process is performed for the fourth time, the rewrite page number is "5" (step S306), and is not greater than the number of selected content pages (four) plus one (five) (NO at step S309). The CPU 31 checks the rewrite information for the slave paper 4 corresponding to the rewrite page number "5" (step S312 and step S313). As rewriting of the slave paper 4 is permitted (NO at step S313), the CPU 31 returns to step S306, adds one to the rewrite page number and performs processing for the slave paper 4 corresponding to the next page.

When the process is performed for the fifth time, the rewrite page number is "6" (step S306), and is greater than the number of selected content pages (four) plus one (five) (YES at step S309). Therefore, the CPU 31 sets the rewrite start position "startpos" to "2" (step S320). Accordingly, through the data display process of the selected content display process shown in FIG. 13 (step S210, FIG. 14), the selected content is displayed from the slave paper 4 in the second page position. In the above-described example, as the number of selected content pages is four, the selected content is consecutively displayed from the second to the fifth slave papers 4.

Through the above-described processes, the CPU 31 unfailingly changes the rewrite information for the rewrite-inhibited slave paper 4 and performs temporary rewriting. Accordingly, even if one of the slave papers 4 on which the selected content is to be displayed does not permit rewriting, all the selected content pages can be displayed on consecutive pages starting from the second page.

When performing temporary rewriting as described above, if the CPU 31 repeats temporary rewriting to further display a different content on the page on which the selected content has been displayed through temporary rewriting, it is not easy to restore the original display content to the slave paper 4 that was originally set to inhibit rewriting, and the user may not be able to refer to the original display content of the slave paper 4. Therefore, a limit may be set on the number of times that temporary rewriting can be performed, so that temporary rewriting is not repeatedly performed on the slave paper 4 that has once been temporarily rewritten. A modified example in which this kind of repetition limit is implemented will be explained with reference to FIG. 20.

Figure 20:
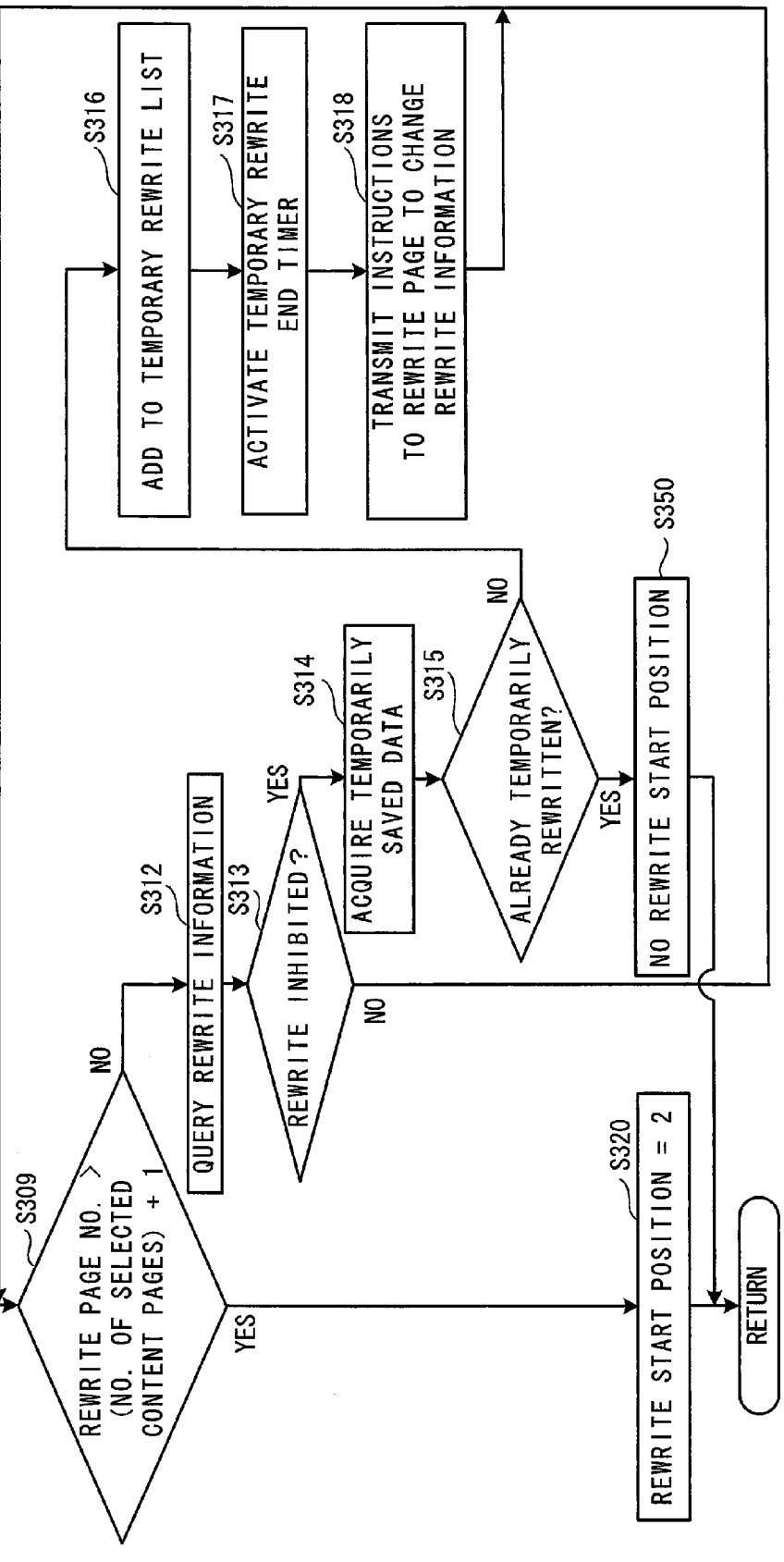
FIG. 20 is a flowchart of a modified example of the rewrite start position acquisition process according to the first embodiment.
Figure 21:
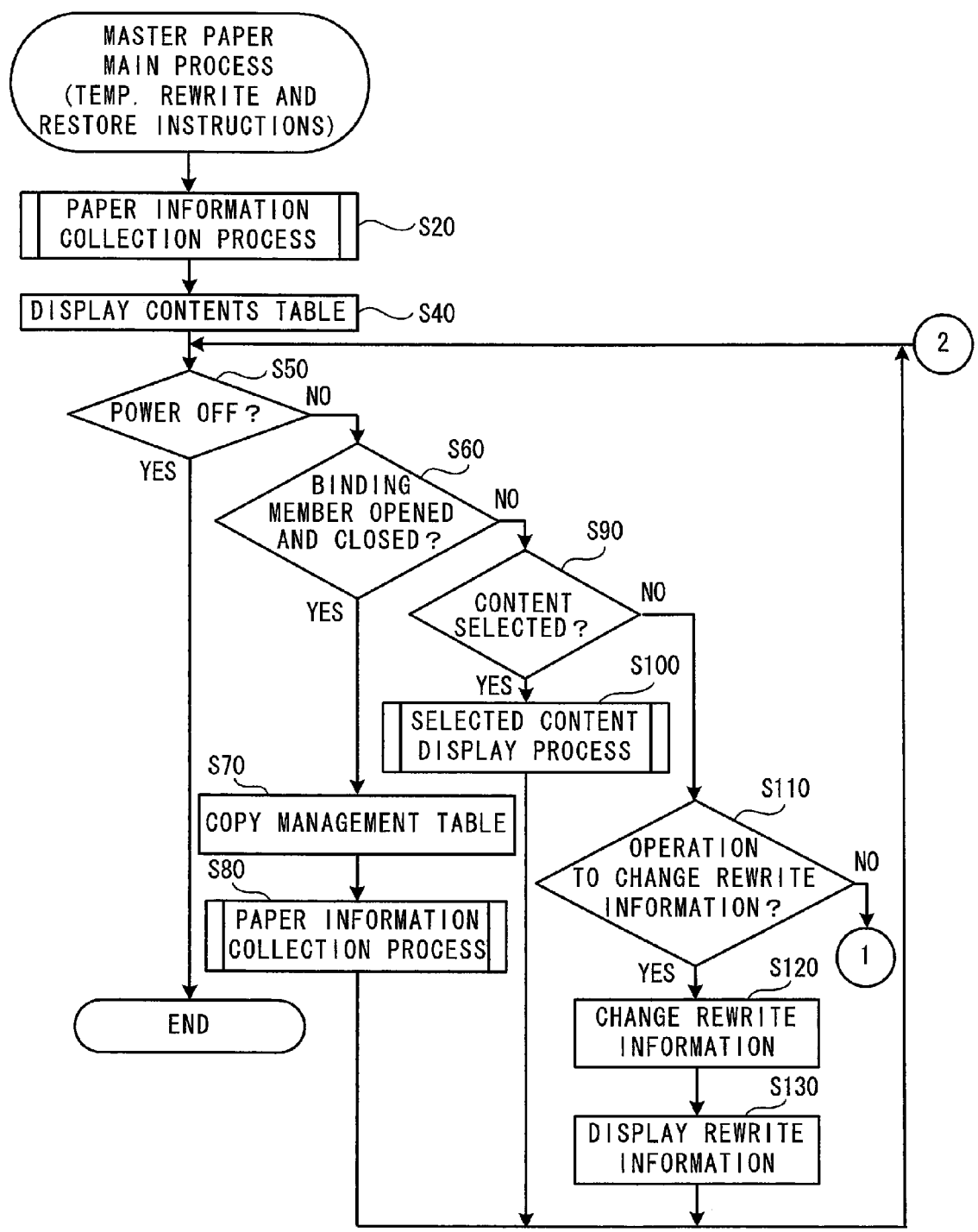
FIG. 21 is one part of a flowchart of a modified example of the master paper main process when a user instructs restoration of a temporary rewrite.

As shown in FIG. 20, in the modified example of the rewrite start position acquisition process according to the first embodiment, the process is substantially the same as the rewrite start position acquisition process of the first embodiment. However, when the rewrite page paper does not permit rewriting (YES at step S313), after the CPU 31 acquires the temporarily saved page data stored in the temporarily saved page data storage area 443 (step S314), the CPU 31 determines whether or not the rewrite page paper is already temporarily rewritten (step S315). The CPU 31 can determine whether the rewrite page paper is already temporarily rewritten by checking whether or not temporary rewrite data for the rewrite page paper is stored in the temporary rewrite list. If the rewrite page paper is not already temporarily rewritten (NO at step S315), the CPU 31 continues the rewrite start position acquisition process in the same way as in the first embodiment (step S316 to step S318). If the rewrite page paper is already temporarily rewritten (YES at step S315), so that the rewrite page paper is not further temporarily rewritten, the CPU 31 sets the rewrite start position "startpos" as "null" and does not set a value (step S350). The limit on the number of temporary rewrites does not necessarily need to be limited to one time, but may be set as an upper limit of two or three times. When the limit on the number of repetitions is set as two or more, the CPU 31 may determine whether or not the repetitions equal a predetermined number or less by checking the number of temporary rewrite data records for the rewrite page paper in the temporary rewrite list.

In the above-described first embodiment, by activating the timer event, the display content of the temporarily rewritten slave paper 4 is restored after a predetermined period of time. On the other hand, the system may be structured such that the user can issue instructions to restore the content. With this type of structure, a process responding to restoration instructions from the user may be added to the master paper main process. Such a modified example will be explained with reference to FIG. 21 and FIG. 22.

Figure 22:
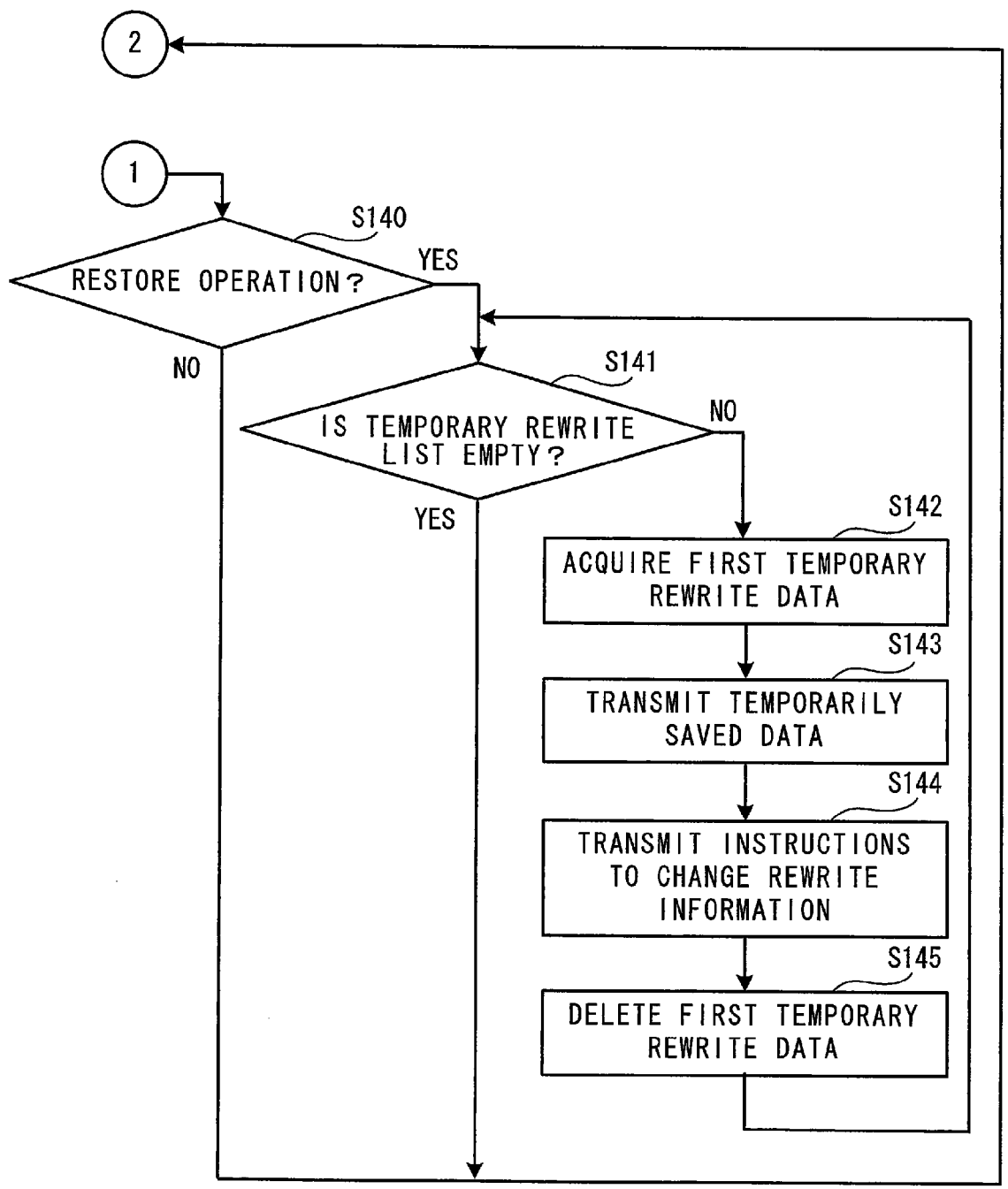
FIG. 22 is the other part of the flow chart of the modified example of the master paper main process.

In the modified example of the master paper main process, processing is performed in the same way as in the basic master paper main process (see FIG. 9). However, if there is no operation to change the rewrite information of the master paper 3 (NO at step S110), the CPU 31 does not simply return to step S50, but determines whether or not an operation has been performed to instruct restoration (step S140), as shown in FIG. 22. If an operation has been performed to instruct restoration (YES at step S140), the CPU 31 checks the temporary rewrite list. If there is no temporary rewrite data stored in the temporary rewrite list and the temporary rewrite list is empty (YES at step S141), there is no display data that should be restored, and the CPU 31 returns to step S50 in FIG. 21.

As shown in FIG. 22, if temporary rewrite data is stored in the temporary rewrite list (NO at step S141), the CPU 31 acquires the first temporary rewrite data on the temporary rewrite list from the temporary rewrite list (step S142). The CPU 31 transmits the acquired page data along with a command to display the acquired page data to the slave paper 4 corresponding to the page number for the temporary rewrite data, then waits to receive a response from the slave paper 4 (step S143). Here, the transmitted command is (S, *, "paper manufacturing number corresponding to page number," REQWRITE, page data).

The CPU 31 transmits to the slave paper 4 on which the display content has been restored a command to return the slave paper 4 to a rewrite inhibit setting, and waits to receive a response from the slave paper 4 (step S144). Here, the transmitted command is (S, *, "paper manufacturing number corresponding to page number," REQWRW). The CPU 31 deletes the temporary rewrite data (the record) for the first ID on the temporary rewrite list from the temporary rewrite list (step S145). The CPU 31 repeats step S141 to step S145 until the temporary rewrite list is empty (YES at step S141). Through the above processes in step S140 to step S145, the display content of all the temporarily rewritten slave papers 4 is restored and displayed, and the slave papers 4 are returned to the rewrite inhibit setting, thus allowing the user to view the restored content.

In the above-described first embodiment, the CPU 31 displays the selected contention the number of slave papers 4 necessary to display the selected content by allowing rewriting of the slave papers 4 by the temporary rewriting process, displaying the selected content from the slave paper 4 that follows the master paper 3 on the first page that is the index (namely, from the second page). However, the number of selected content pages is sometimes less than the number of pages in the display device 1 and the selected content can be displayed while leaving the rewrite-inhibited slave papers 4 in their current status. In this type of case, the CPU 31 may search for a location where there are consecutive rewrite-permitted slave papers 4 without performing the temporary rewriting process and write the selected content on the consecutive slave papers 4 to display the selected content. This type of rewrite start position acquisition process according to the second embodiment will be explained with reference to FIG. 23.

Figure 23:
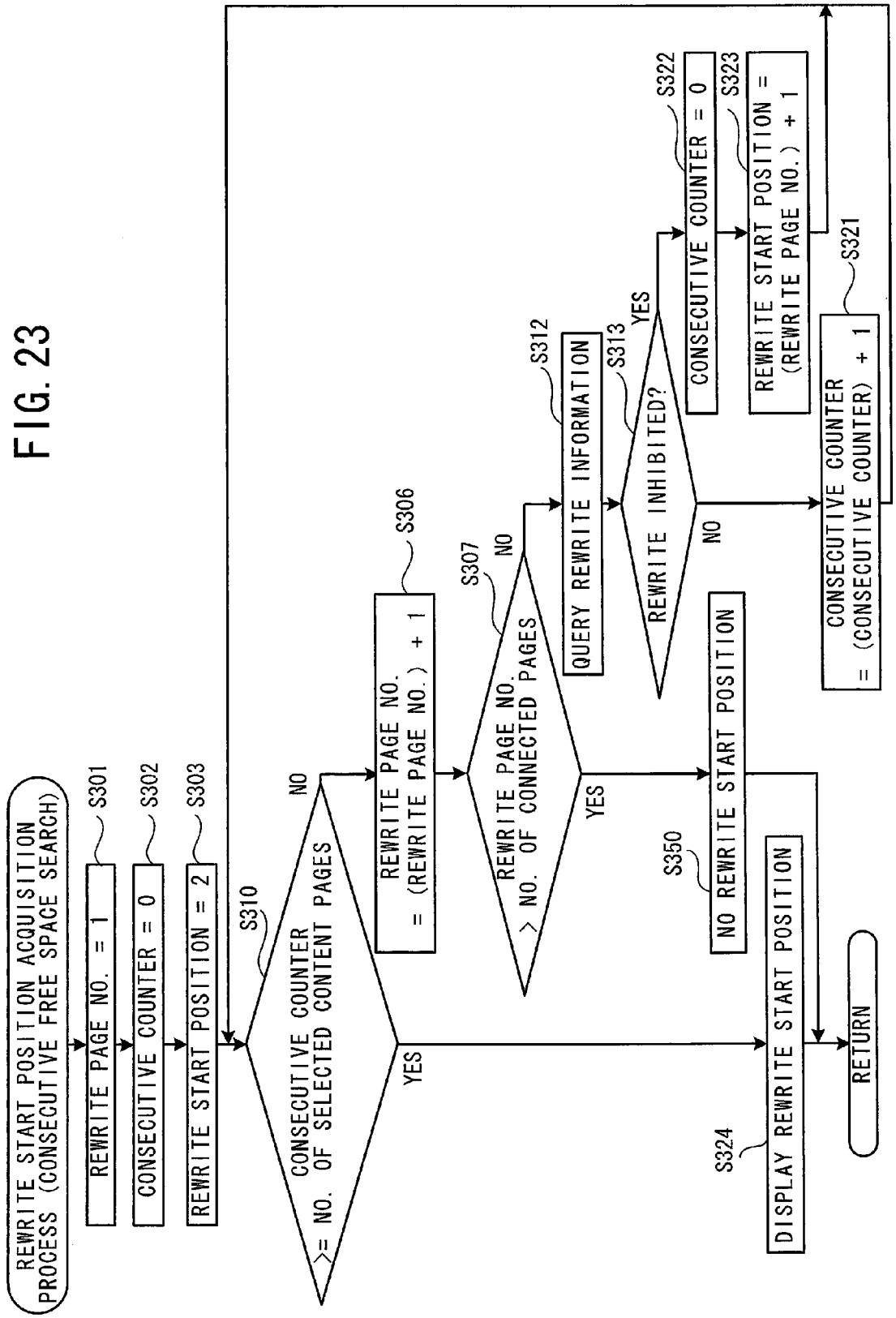
FIG. 23 is a flowchart of a rewrite start position acquisition process according to a second embodiment, performed as part of the selected content display process.

As shown in FIG. 23, when the rewrite start position acquisition process according to the second embodiment is started, the CPU 31 sets the rewrite page number to "1" as an initial setting (step S301). The CPU 31 initializes a consecutive counter that counts the consecutive pages, setting the counter to "0" (step S302). As an initial setting, the CPU 31 sets the rewrite start position "startpos" to "2" (step S303).

The CPU 31 determines whether or not the value of the consecutive counter is equal to or greater than the number of selected content pages (step S310). The value of the consecutive counter indicates the number of consecutive rewrite-permitted slave papers 4. If the value of the consecutive counter is equal to or greater than the number of selected content pages, it is possible to display all the selected content. Here, for example, the number of selected content pages is three.

When the process is performed for the first time, the value of the consecutive counter is "0" and is therefore smaller than the number of selected content pages (three) (NO at step S310). The CPU 31, after adding one to the rewrite page number (step S306), determines whether or not the rewrite page number exceeds the number of connected papers (here, five) (step S307). When the process is performed for the first time, the rewrite page number is "2" and therefore does not exceed the number of connected papers (five) (NO at step S307). The CPU 31 therefore sends a command (REQRRW) to query the rewrite information to the rewrite page paper, and waits to receive a response from the slave paper 4 (step S312). In the present embodiment, the transmitted command is (S, *, "rewrite page paper manufacturing number," REQRRW). When the process is performed for the first time, the command is transmitted to the slave paper 4 (S00234) with the page number "2."

The CPU 31 acquires the rewrite information from the content of the received response, and determines as a result whether or not the slave paper 4 permits rewriting (step S313). If the slave paper 4 does not permit rewriting (YES at step S313), the CPU 31 cannot write on the slave paper 4. The CPU 31 sets the consecutive counter to "0" (step S322), and if the next slave paper 4 permits rewriting, from which CPU 31 starts writing, setting the value acquired by adding one to the rewrite page number as the rewrite start position "startpos" (step S323) If the slave paper 4 with the page number "2" does not permit rewriting, the CPU 31 sets the rewrite start position "startpos" as "3" and returns to step S310 to process the next slave paper 4.

If the respondent slave paper 4 permits rewriting (NO at step S313), the CPU 31 adds one to the consecutive counter (step S321), and returns to step S310 to process the next slave paper 4. If the value of the consecutive counter is equal to or greater than the number of selected content pages (YES at step S310), the CPU 31 displays the rewrite start position "startpos" set in step S303 or in step S323 on the display portion 36 of the master paper 3 (step S324). In this way, the user is notified from which page the selected content is displayed. Then, the CPU 31 returns to the selected content display process (FIG. 13).

For example, if the user wishes to display three pages of selected content, when the slave paper 4 with the page number "2" does not permit rewriting (YES at step S313), the rewrite start position is "3" (step S323). If the slave papers 4 with the page numbers "3," "4" and "15" permit rewriting (NO at step S313), the CPU 31 adds one to the consecutive counter three times (step S321). When the consecutive counter reaches "3,", the consecutive counter reaches the number of pages of the selected content (YES at step S310). The CPU 31 therefore displays the rewrite start position "3" on the master paper 3 (step S324), and returns to the selected content display process (FIG. 13). The rewrite start position "3" is used in the data display process (FIG. 14).

A situation is posited in which the rewrite page number exceeds the number of connected papers (YES at step S307) while the value of the consecutive counter has still not reached the number of selected content pages (NO at step S310). For example, if the number of selected content pages is three, and the slave papers 4 with page numbers "2" and "4" do not permit rewriting, the number of rewrite-permitted slave papers 4 is only two. Therefore, there is an insufficient number of consecutive papers to display the selected content. In this case, as all the selected content cannot be displayed, the CPU 31 sets the rewrite start position "startpos" as "null" and does not set a value (step S350).

Through the above-described processes, the CPU 31 can search for a location with consecutive rewrite-permitted slave papers 4 while avoiding rewrite-inhibited slave papers 4, and can display the selected content in the location.

In the above-described second embodiment, when a page in and around the center position is a rewrite-inhibited slave paper 4, or when a plurality of rewrite-inhibited slave papers 4 are dispersed through the pages, and there are no consecutive pages corresponding to the number of selected content pages, the CPU 31 does not display the selected content. Here, the rewrite start position acquisition process according to the third embodiment will be explained with reference to FIG. 24 to FIG. 26, in which rewrite-permitted pages can be secured when there is a rewrite-inhibited slave paper 4, by moving the display content of the rewrite-inhibited slave paper 4 to another slave paper 4.

Figure 24:
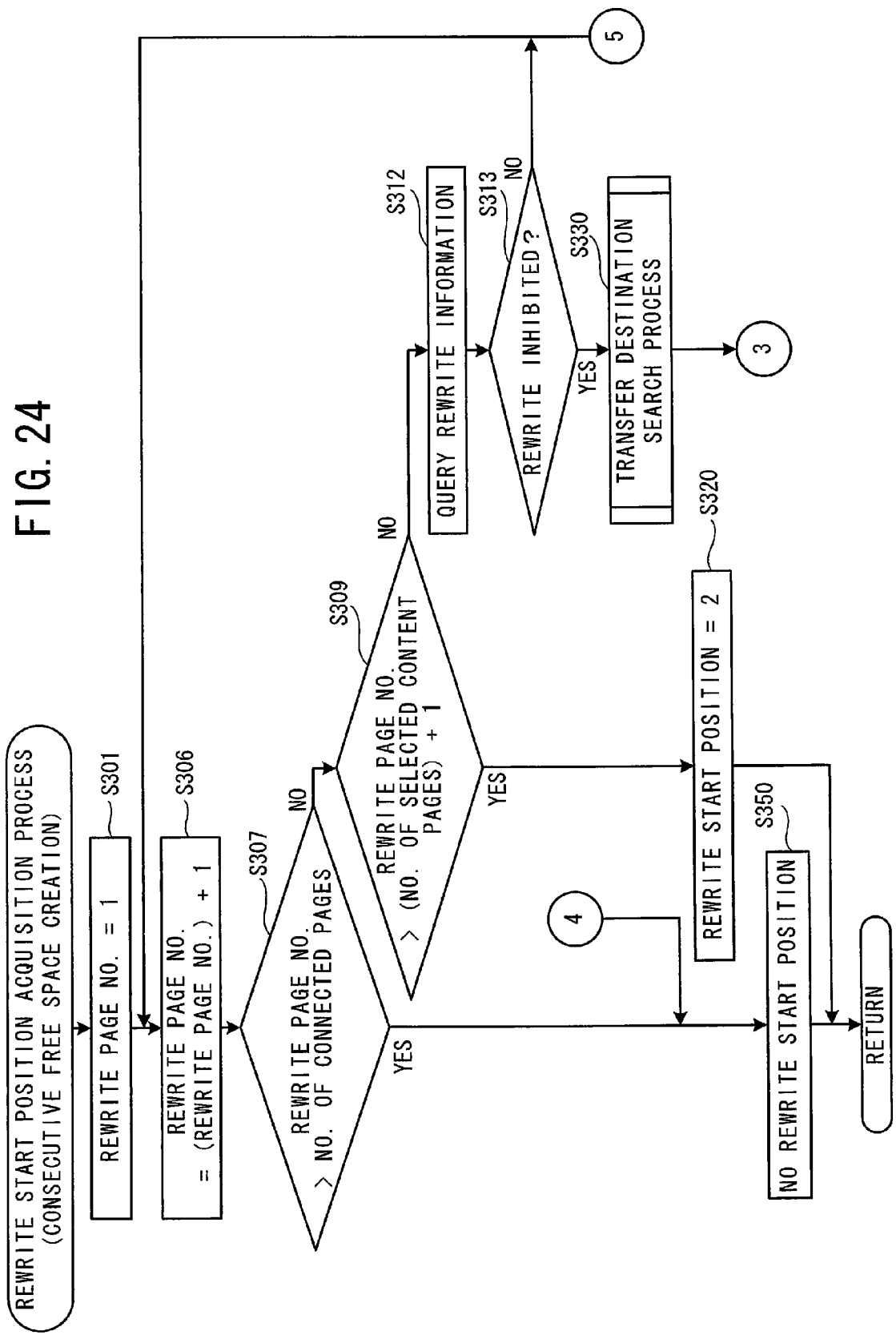
FIG. 24 is one part of a flowchart of a rewrite start position acquisition process according to a third embodiment, performed as part of the selected content display process.

The explanation here will be made assuming that the slave papers 4 with the page numbers "2" and "5" do not permit rewriting, and that two pages of content has been selected. As shown in FIG. 24, when the rewrite start position acquisition process according to the third embodiment is started, the CPU 31 sets the rewrite page number to "1" as an initial setting (step S301). After adding one to the rewrite page number (step S306), the CPU 31 determines whether or not the rewrite page number exceeds the number of connected papers (step S307).

When the process is performed for the first time, the rewrite page number is "2" and the number of connected papers is five, so the rewrite page number does not exceed the number of connected papers (NO at step S307). The CPU 31 determines whether or not the rewrite page number is greater than the number of selected content pages plus one (step S309). If the rewrite page number is not greater than the number of selected content pages plus one (NO at step S309), the CPU 31 transmits a command (REQRRW) querying the rewrite information to the rewrite page paper, and waits to receive a response from the rewrite page paper (step S312). In the present embodiment, the transmitted command is (S, *, "rewrite page paper manufacturing number," REQRRW).

The CPU 31 acquires the rewrite information from the content of the received response, and determines as a result whether or not the slave paper 4 permits rewriting (step S313). As the slave paper 4 (S00234) with the page number "2" is set to inhibit rewriting (YES at step S313), the CPU 31, in order to transfer the display content of the slave paper 4 (curpos 2) to a later position, performs the process to search for a transfer destination (step S330). Details of the transfer destination search process have already been explained with reference to FIG. 26, and an explanation will therefore be omitted here. Here, the slave paper 4 with the page number "5" does not permit rewriting, so the slave paper 4 with the page number "4" becomes the transfer destination (forwardpos=4).

Figure 25:
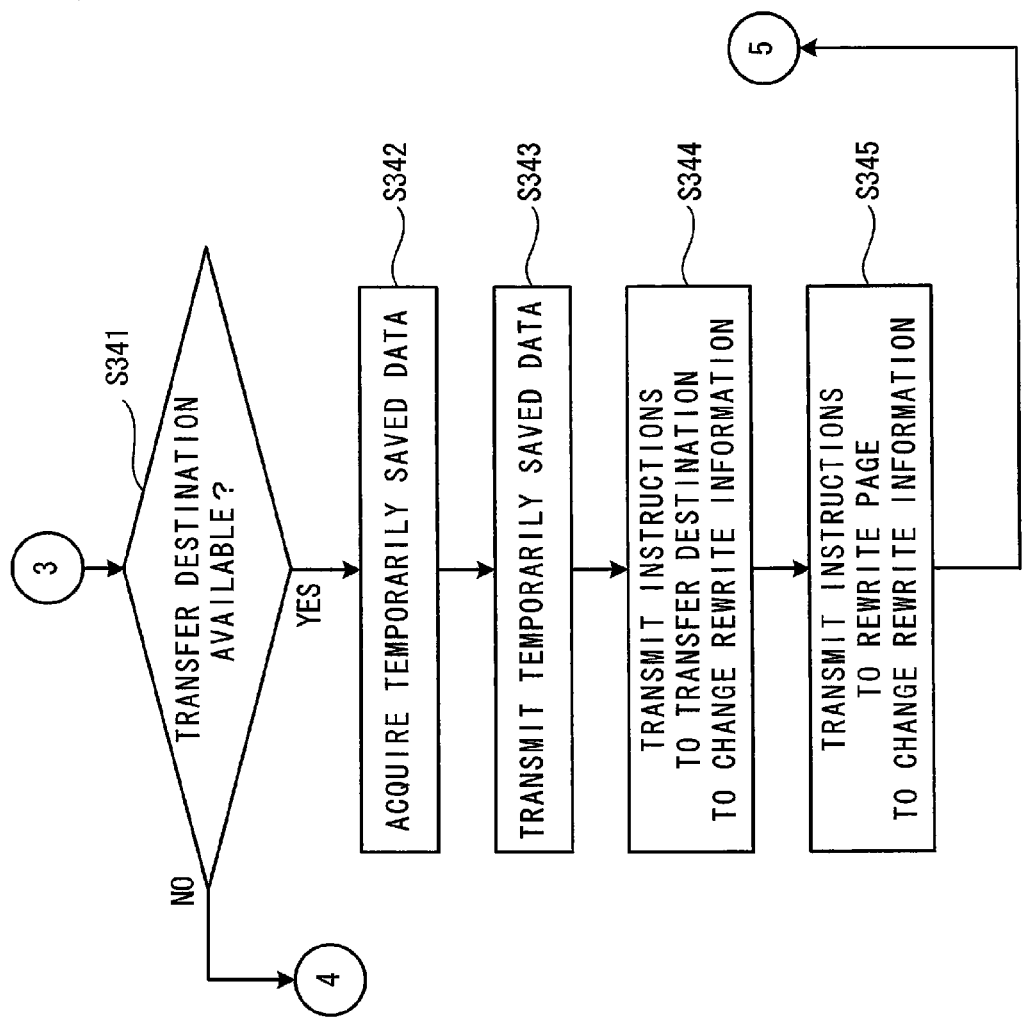
FIG. 25 is the other part of the flowchart of the rewrite start position acquisition process according to the third embodiment.

When the transfer destination search process is completed, the CPU 31 determines whether or not the transfer destination has been found by determining whether or not the "forwardpos" is "null" (step S341), as shown in FIG. 25.

If the transfer destination has been found (YES at step S341), the CPU 31 acquires the temporarily saved page data stored in the temporarily saved page data storage area 443 of the EEPROM 44 for the slave paper 4 corresponding to the rewrite page number (the rewrite page number is "2" when the process is performed for the first time) (step S342). The CPU 31 transmits the temporarily saved page data along with a command to display the temporarily saved page data to the transfer destination paper (here, the fourth page of the slave paper 4 "S03741"), and waits to receive a response from the transfer destination paper (step S343). Here, the transmitted command is (S, *, "manufacturing number of paper corresponding to forwardpos," REQWRITE, page data).

The CPU 31 transmits a command to change the setting of the transfer destination paper to inhibit rewriting, and waits to receive a response from the transfer destination paper (step S344). Here, the transmitted command is (S, *, "paper manufacturing number corresponding to forwardpos," REQWRW). The CPU 31 transmits to the rewrite page paper a command to change the rewrite page paper setting to permit rewriting, and waits to receive a response from the rewrite page paper (step S345). Here, the transmitted command is (S, *, "rewrite page paper manufacturing number," REQWRW).

Through the above-described processes, the display content of the slave paper 4 "S00234" corresponding to the rewrite-inhibited rewrite page number (2) is transferred to the transfer destination paper (page number 4, paper number S03741), and the page for the rewrite page number (2) is changed to permit rewriting, while the setting of the transfer destination paper is changed to inhibit rewriting. The CPU 31 returns to step S306 in FIG. 24 in order to process the next page.

When the process is performed for the second time, the rewrite page number is "3" (step S306), which does not exceed the number of selected content pages (two) plus one (three) (NO at step S309). The CPU 31 therefore checks the rewrite information of the rewrite page paper (step S312 and step S313). As the slave paper 4 with the page number "3" is rewrite-permitted (NO at step S313), the CPU 31 returns to step S306, adds one to the rewrite page number and performs processing of the slave paper 4 corresponding to the next page.

When the process is performed for the third time, the rewrite page number is "4" (step S306), which is larger than the number of selected content pages (two) plus one (three) (YES at step S309). Accordingly, as the number of rewrite-permitted consecutive slave papers 4 sufficient for the number of selected content pages can be secured from the slave paper 4 with the page number "2," the CPU 31 sets the rewrite start position "startpos" as "2" (step S320), and returns to the selected content display process.

On the other hand, if the rewrite page number becomes larger than the number of connected papers (YES at step S307), it turns out that a sufficient number of the rewrite-permitted slave papers 4 for the number of selected content pages has not been secured, even if the rewrite-inhibited slave paper 4 is transferred. Accordingly, the CPU 31 does not display the selected content, sets the rewrite start position "startpos" to "null" and does not set a value (step S350).

Through the above-described processes, the CPU 31 can transfer the display content of the rewrite-inhibited slave paper 4 to a later position in the order, permit rewriting of the earlier slave paper 4 and secure the consecutive slave papers 4, allowing the display of the selected content from the second page.

In this way, when the display content of the rewrite-inhibited slave paper 4 is transferred to another of the slave papers 4, the display content of the rewrite-inhibited slave paper 4 can also be moved to an earlier position, making the content easy to access. This type of modified example will be explained with reference to FIG. 25, FIG. 27 and FIG. 28. Nos. 3 to 5 shown in FIG. 27 correspond to Nos. 3 to 5 shown in FIG. 25.

Figure 27:
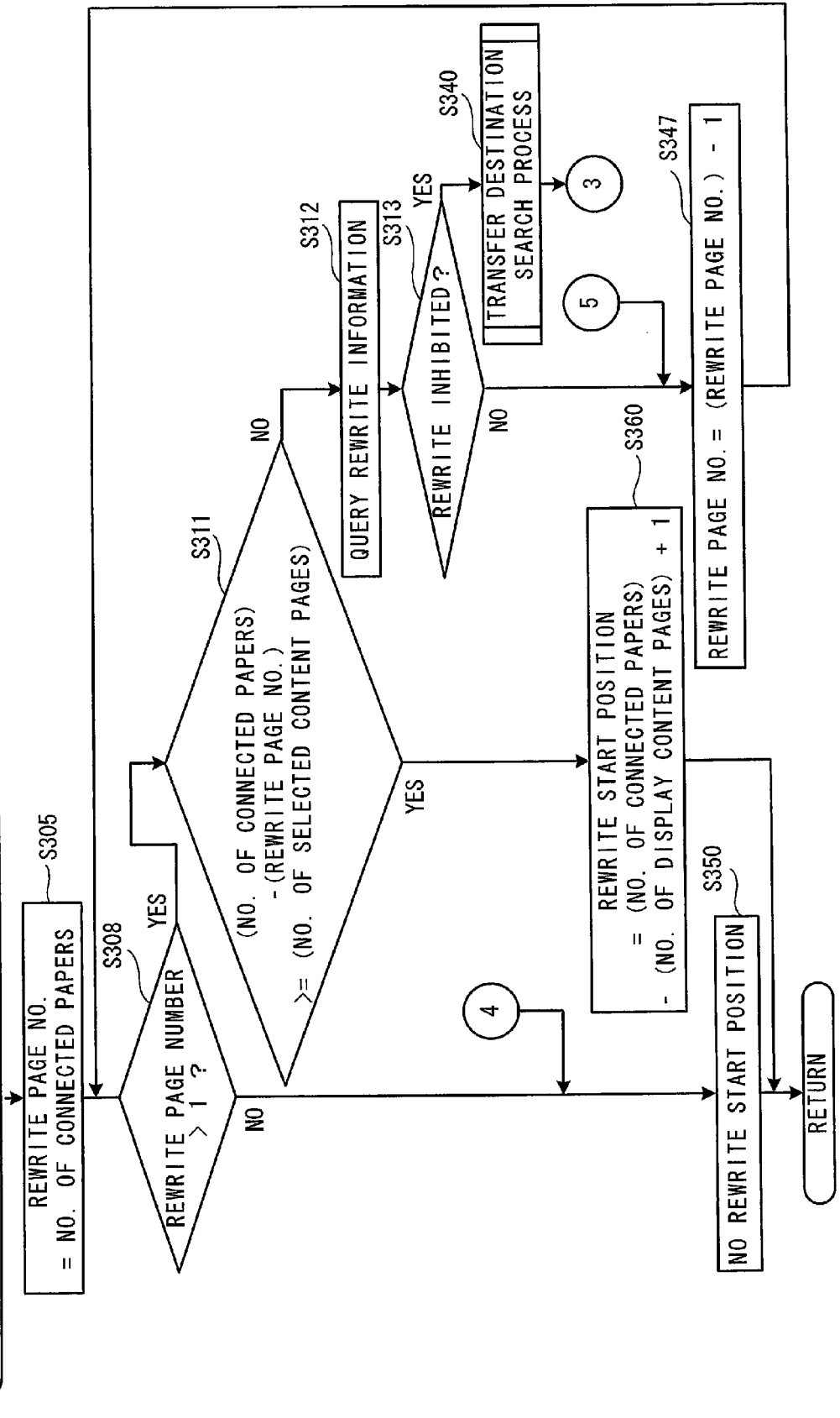
FIG. 27 is one part of a flowchart of a modified example of the rewrite start position acquisition process according to the third embodiment.

As shown in FIG. 27, when the modified example of the rewrite start position acquisition process according to the third embodiment is started, the CPU 31 sets the number of connected papers stored in the number of connected papers storage area 331 as the rewrite page number (step S305). In this way, processing is performed in order from the last electronic paper 5. Here, the number of connected papers is five so the rewrite page number is set as "5." Next, the CPU 31 determines whether or not the rewrite page number exceeds one (step S308).

When the process is performed for the first time, the rewrite page number is "5," which exceeds one (YES at step S308). Accordingly, the CPU 31 determines whether or not the value of the number of connected papers minus the rewrite page number is equal to or greater than the number of selected content pages (step S311). This determines whether or not a sufficient number of the consecutive rewrite-permitted slave papers 4 for the number of selected content pages has been secured.

If there are two pages of selected content, the difference between the number of connected papers "5" and the rewrite page number "5" is "0", and the value "0" is smaller than the number of selected content pages "2" (NO at step S311). The CPU 31 transmits a command (REQRRW) querying the rewrite information to the slave paper 4 corresponding to the rewrite page number, and waits to receive a response from the slave paper 4 (step S312). In the present embodiment, the transmitted command is (S, *, "rewrite page paper manufacturing number", REQRRW).

The CPU 31 acquires the rewrite information from the content of the received response, and determines as a result whether or not the slave paper 4 permits rewriting (step S313). If the slave paper 4 (S08507) with the rewrite page number "5" does not permit rewriting (YES at step S313), the CPU 31 performs a process to search for a transfer destination in order to transfer the display content of the slave paper 4 (curpos=5) to an earlier position (step S340). The transfer destination search process will be explained with reference to FIG. 28.

Figure 28:
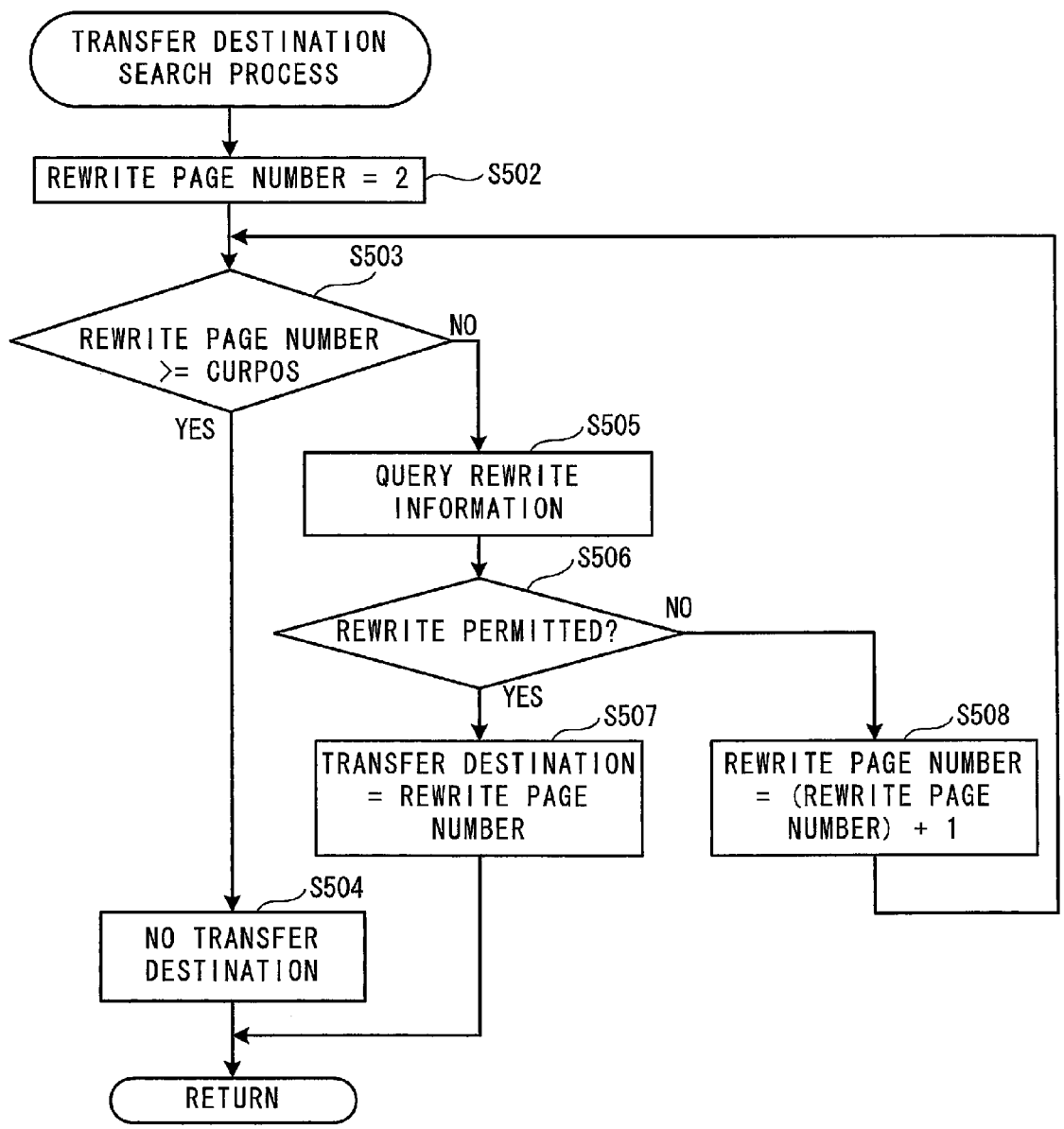
FIG. 28 is a flowchart of the transfer destination search process performed as part of the modified example of the rewrite start position acquisition process according to the third embodiment.

As shown in FIG. 28, in the transfer destination search process performed in order to transfer the display content of the rewrite-inhibited slave paper 4 to an earlier position, the CPU 31 first sets the rewrite page number to "2" (step S502). By doing this, processing starts from the slave paper 4 that is the second page, in the position immediately next to the master paper 3. The CPU 31 determines whether or not the value of the rewrite page number is equal to or greater than the page number (curpos) of the slave paper 4 that is to be transferred. In other words, the CPU 31 determines whether or not there is another of the slave papers 4 in an earlier position to the slave paper 4 that is to be transferred (step S503). Here, the page number of the slave paper 4 to be transferred is "5," and when processing is performed for the first time, the rewrite page number is "2," so the value of the rewrite page number does not reach the curpos (NO at step S503). Accordingly, the CPU 31 transmits a command (REQRRW) querying the rewrite information to the rewrite page paper, and waits to receive a response from the rewrite page paper (step S505). In the present embodiment, the transmitted command is (S, *, "rewrite page paper manufacturing number," REQRRW).

The CPU 31 acquires the rewrite information from the content of the received response and determines as a result whether or not the rewrite page paper permits rewriting (step S506). If the rewrite page paper permits rewriting (YES at step S506), the CPU 31 determines that the rewrite page paper 4 is the transfer destination. Specifically, the CPU 31 sets the rewrite page number value as the transfer destination "forwardpos" (step S507), and returns to the rewrite start position acquisition process. If the rewrite page paper does not permit rewriting (NO at step S506), the CPU 31 cannot transfer the display content of the rewrite-inhibited slave paper 4 to the rewrite page paper. Here, in order to check whether or not the display content of the rewrite-inhibited slave paper 4 can be transferred to the slave paper 4 in the next position, the CPU 31 adds one to the rewrite page number (step S508) and returns to step S503. For example, if the slave paper 4 with the page number "2" does not permit rewriting, the CPU 31 checks the slave paper 4 with the page number "3". If the slave paper 4 with the page number "3" permits rewriting (YES at step S506), the CPU 31 sets "3" as the transfer destination "forwardpos" (step S507). If the slave paper 4 with the page number "3" does not permit rewriting (NO at step S506), the CPU 31 checks the slave paper 4 with the page number "4". If the slave paper 4 with the page number "4" also does not permit rewriting (NO at step S506), the CPU 31 checks the slave paper 4 with the page number "5."

When the rewrite page number is "5" and reaches the page number (curpos) of the slave paper 4 that is to be transferred (YES at step S503), there is no transfer destination for the display content of the rewrite-inhibited slave paper 4. Accordingly, the CPU 31 sets the transfer destination "forwardpos" as "null," does not set a value (step S504) and returns to the rewrite start position acquisition process shown in FIG. 27.

Processing after the transfer destination search process (step S340) will be explained with reference to FIG. 25. Through the above-described transfer destination search process, the page number of the slave paper 4 to which the display content of the rewrite-inhibited slave paper 4 is transferred is acquired as the "forwardpos." As shown in FIG. 25, the CPU 31 determines whether or not the transfer destination has been found by determining whether or not the "forwardpos" is "null" (step S341).

If the transfer destination has been found (YES at step S341), the CPU 31 acquires the temporarily saved page data stored in the temporarily saved page data storage area 443 of the EEPROM 44 for the rewrite page paper (step S342). The CPU 31 transmits the temporarily saved page data to the transfer destination paper, along with a command to display the temporarily saved page data, and waits to receive a response from the transfer destination paper (step S343). Here, the transmitted command is (S, *, "paper manufacturing number corresponding to forwardpos," REQWRITE, page data).

The CPU 31 transmits a command to change the setting of the transfer destination paper to inhibit rewriting, and waits to receive a response from the transfer destination paper (step S344). Here, the transmitted command is (S, *, "rewrite page paper manufacturing number," REQWRW). The CPU 31 transmits a command to change the setting of the rewrite page paper to permit rewriting, and waits to receive a response from the transfer destination paper (step S345). Here, the transmitted command is (S, *, "paper manufacturing number corresponding to forwardpos," REQWRW).

Through the above-described processes, the display content of the rewrite-inhibited slave paper 4 corresponding to the rewrite page number (5 in the example above) is transferred, the setting of the slave paper 4 is changed to permit rewriting, and the transfer destination paper (the slave paper 4 with the page number 3 in the example above) is changed to disallow rewriting. Returning to FIG. 27, in order to process the next page, the CPU 31 subtracts one from the rewrite page number (step S347) and returns to step S308.

When the process is performed for the second time, the rewrite page number is "4" and the value of the number of connected papers minus the rewrite page number is "1," so the CPU 31 performs processing in the same manner as the first time. When the process is performed for the third time, the rewrite page number is "3" and the value of the number of connected papers minus the rewrite page number is "2," thus reaching the number of selected content pages (YES at step S311). Accordingly, a sufficient number of the rewrite-permitted consecutive slave papers 4 can be secured for the number of selected content pages. The CPU 31 subtracts the number of selected content pages "2" from the number of connected papers "5" and adds one, thus setting "4" as the rewrite start position "startpos" (step S320). The CPU 31 then returns to the selected content display process. As a result, the selected content is displayed in a later position on the display device 1. Here, the content of two pages is displayed, from the fourth page slave paper 4.

On the other hand, if the rewrite page number becomes "1" (NO at step S308), even if the display content of the rewrite-inhibited slave paper 4 is transferred to another of the slave papers 4, a sufficient number of the rewrite-permitted consecutive slave papers 4 has not been secured for the number of selected content pages. The CPU 31 therefore does not display the selected content, sets the rewrite start position "startpos" as "null" and does not set a value (step S350).

Through the above processes, the CPU 31 transfers the display content of the rewrite-inhibited slave paper 4 in a later position to the slave paper 4 in an earlier position in terms of order (immediately after the master paper 3), and changes the setting of the slave paper 4 in the later position to permit rewriting. Accordingly, the consecutive slave papers 4 are secured, so the CPU 31 can display the selected content such that the last page of the selected content is on the last page of the display device 1.

Above, the first to third embodiments have been explained with regard to the methods used by the CPU 31 to display the selected content when the selected content cannot be consecutively displayed from the slave paper 4 with the page number "2" due to the presence of the rewrite-inhibited slave paper 4. The embodiments may be used separately, or some or all of the embodiments may be used in combination. Here, the process in which the first to third embodiments are all used in combination will be explained with reference to FIG. 29.

Figure 29:
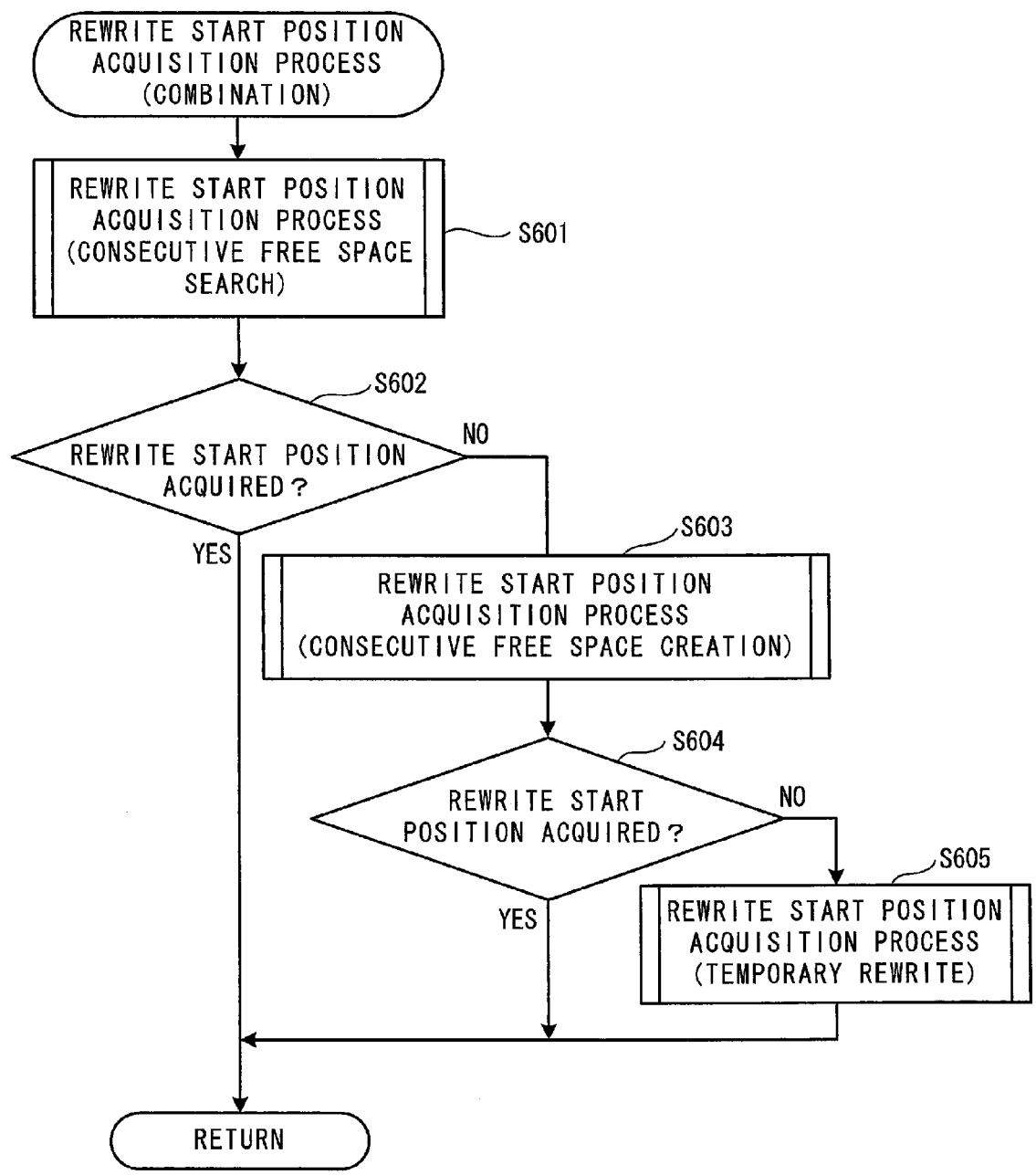
FIG. 29 is a flowchart of a rewrite start position acquisition process according to a fourth embodiment that is a combination of the rewrite start position acquisition processes according to the first to third embodiments.

As shown in FIG. 29, in the rewrite start position acquisition process according to the fourth embodiment, first the rewrite start position acquisition process according to the second embodiment is performed, as explained in FIG. 23. In other words, the CPU 31 avoids the rewrite-inhibited slave papers 4, searches for a location in which there are consecutive rewrite-permitted slave papers 4, and checks whether or not the selected content can be displayed in that location (step S601). Next, the CPU 31 determines whether or not the rewrite start position "startpos" has been acquired by the rewrite start position acquisition process according to the second embodiment. Namely, the CPU 31 determines whether or not there is a location in which there are consecutive rewrite-permitted slave papers 4 that avoid the rewrite-inhibited slave papers 4 (step S602). If the rewrite start position "startpos" has been acquired (YES at step S602), the CPU 31 can display the selected content in the location with the consecutive rewrite-permitted slave papers 4, and therefore returns to the selected content display process.

If the rewrite start position "startpos" has not been acquired (NO at step S602), the rewrite start position acquisition process according to the third embodiment as explained in FIG. 24, or the modified example of the rewrite start position acquisition process according to the third embodiment as explained in FIG. 27 is performed. In other words, the CPU 31 transfers the display content of the rewrite-inhibited slave paper 4 to a later position or an earlier position in the display device 1, changes the setting of the slave paper 4 from which the contents are transferred to permit rewriting, and secures the consecutive pages (step S603). The CPU 31 determines whether or not the rewrite start position "startpos" has been acquired by the rewrite start position acquisition process according to the third embodiment or by the modified example of the rewrite start position acquisition process according to the third embodiment. In other words, the CPU 31 determines whether or not a sufficient number of the consecutive pages has been secured in a later position or an earlier position for the number of selected content pages (step S604). If the rewrite start position "startpos" has been acquired (YES at step S604), the CPU 31 can display the selected content in the secured location and therefore returns to the selected content display process.

If the rewrite start position "startpos" has not been acquired (NO at step S604), the CPU 31 performs the rewrite start position acquisition process according to the first embodiment as explained in FIG. 17 (step S605), and consecutively displays the selected content in the selected content display process by temporarily changing the setting of the rewrite-inhibited slave paper 4 to rewrite-permitted.

If consecutive pages are secured by a combination of the embodiments, as in the fourth embodiment, it is possible to avoid as much as possible a situation in which the rewrite-inhibited pages cannot be viewed, and the inconvenience of not being able to display the selected content is also resolved.

As explained above, in the display device 1, a plurality of the electronic papers 5 (the master paper 3 and the slave papers 4) are bound together by the binding member 2. The master paper 3 is the output device that outputs the display data on the plurality of slave papers 4 bound together by the binding member 2. The rewrite information is set for the display data displayed on each of the electronic papers 5. As the display data is allocated to the consecutive electronic papers 5 based on the rewrite information, no rewrite-inhibited page is intercalated with the pages displaying a single content, and the user can easily view the selected content.

The binding member 2 according to the above embodiments has been explained as a ring-shaped member, but the binding member 2 may have any form that is provided with a penetrating portion that passes through the through-holes of the electronic papers 5. For example, the electronic papers may be bound using a binding member that has a rod shaped penetrating portion.

According to the above-described embodiments, the slave papers 4 are explained as being bound together by the ring-shaped binding member 2, but the electronic papers may be connected to terminals in an electronic binder unit, as with the electronic binders disclosed in the above-mentioned publication.

In the examples above, the data transmission has been performed using the manufacturing number as the identifier, as in (S, *, S00234, REQWRITE, "display data"), but communications can be performed using the in-ring position, such as (S, 127, *, REQWRITE, "display data"). In this type of communication method, the slave paper identifier is not collected, and the same processes can be performed.

In the above-described embodiments, after the selected content display process of step S100 as shown in FIG. 9, the page number or the paper number of the paper on which the first page of the selected content is actually displayed may be displayed on the master paper 3. If this is done, when a plurality of the electronic papers 5 are bound together, even if rewriting is performed from the middle of the electronic papers 5, the user can easily perform a search to determine from which of the electronic papers 5 the selected content is displayed.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A display device comprising:
a plurality of electronic papers that are each provided with a display surface, the display surface outputting a piece of display data, the piece of display data being a piece of data for an image and/or a text in a page unit;
a binding member that binds together the plurality of electronic papers;
an output device that controls output of the piece of display data to each of the plurality of electronic papers;
a first storage device that stores rewrite information indicating whether or not to permit rewriting of the piece of display data on each of the plurality of electronic papers;
a second storage device that stores a plurality of pieces of display data to be displayed on the plurality of electronic papers;
an allocation device that respectively allocates the plurality of pieces of display data stored in the second storage device to a consecutive series of electronic papers for which the rewrite information permits rewriting, based on the rewrite information stored in the first storage device;
a display control device that respectively displays the plurality of pieces of display data allocated by the allocation device on the consecutive series of electronic papers;
a third storage device that stores the piece of display data displayed on each of the plurality of electronic papers;
a rewrite-permit device that, when the plurality of pieces of display data are respectively allocated to the consecutive series of electronic papers by the allocation device, changes the rewrite information on an electronic paper for which the rewrite information inhibits rewriting so that the rewrite information permits rewriting; and
a restoration device that, after the plurality of pieces of display data have been respectively displayed on the plurality of electronic papers by the display control device, at a predetermined timing, returns the rewrite information changed to permit rewriting by the rewrite-permit device to once more inhibit rewriting, and restores the piece of display data stored in the third storage device to the display surface of the electronic paper for which the rewrite information was changed to permit rewriting.

2. The display device according to claim 1, wherein the restoration device operates after a predetermined period of time has elapsed from the time at which the rewrite information is changed to permit rewriting by the rewrite-permit device.

3. The display device according to claim 1, further comprising:
a restoration instruction device that instructs restoration of the piece of display data stored in the third storage device, wherein
the restoration device operates when an instruction is issued by the restoration instruction device.

4. The display device according to claim 1, further comprising:
a repetition control device that limits the number of times that the rewrite information can be changed to permit rewriting by the rewrite-permit device to a predetermined number of times or less.

5. The display device according to claim 1, further comprising:
a transfer device that transfers the piece of display data displayed on the electronic paper for which the rewrite information inhibits rewriting to another electronic paper, and displays the piece of display data on the electronic paper to which the piece of display data is transferred;
a rewrite information changing device that changes the rewrite information of the electronic paper from which the piece of display data is transferred by the transfer device to permit rewriting, and changes the rewrite information of the electronic paper to which the piece of display data is transferred to inhibit rewriting; and
a consecutive reservation device that consecutively reserves electronic papers for which the rewrite information permits rewriting by transfer of the piece of display data by the transfer device and changing of the rewrite information by the rewrite information changing device; wherein the allocation device respectively allocates the plurality of pieces of display data to the electronic papers reserved by the consecutive reservation device, and when electronic papers for which the rewrite information permits rewriting have not been consecutively reserved by the consecutive reservation device, the rewrite-permit device changes the rewrite information on an electronic paper for which the rewrite information inhibits rewriting so that the rewrite information permits rewriting.

6. The display device according to claim 5, wherein the consecutive reservation device consecutively reserves the electronic papers to the front within the binding member.

7. The display device according to claim 5, wherein the consecutive reservation device consecutively reserves the electronic papers to the rear within the binding member.

8. The display device according to claim 1, wherein:

each of the plurality of electronic papers includes a position detection device that detects position information indicating a position of the each of the plurality of electronic papers within the binding member;

the output device includes a position information acquisition device that acquires from each of the plurality of electronic papers the position information detected by the position detection device and an order calculation device that calculates an order of binding of each of the plurality of electronic papers bound in the display device, based on the position information acquired by the position information acquisition device; and the allocation device respectively allocates the plurality of pieces of display data stored in the second storage device to the consecutive series of electronic papers for which the rewrite information permits rewriting, based on the order of binding calculated by the order calculation device and on the rewrite information stored in the first storage device.

9. The display device according to claim 8, wherein:

the output device includes an identification information acquisition device that acquires identification information to identify each of the plurality of electronic papers from the each of the plurality of electronic papers corresponding to the position information acquired by the position information acquisition device;

the allocation device respectively allocates the plurality of pieces of display data stored in the second storage device to the plurality of electronic papers in relation to the identification information acquired by the identification information acquisition device; and the display control device respectively displays the plurality of pieces of display data on the plurality of electronic papers each having the respective identification information acquired by the identification information acquisition device.

10. The display device according to claim 9, wherein:

each of the plurality of electronic papers includes a through-hole;

the binding member includes a penetrating portion that pass through the through-hole; and the position detection device of each of the plurality of electronic papers detects which position the each of the plurality of electronic papers is in contact with the penetrating portion.

11. An output device that controls output of a piece of display data displayed on each of a plurality of electronic papers, the piece of display data being a piece of data for an image and/or a text in a page unit, the plurality of electronic papers being each provided with a display surface and bound together by a binding member, the output device comprising:

a first storage device that stores rewrite information indicating whether or not to permit rewriting of the piece of display data on each of the plurality of electronic papers;

a second storage device that stores a plurality of pieces of display data to be displayed on the plurality of electronic papers;

an allocation device that respectively allocates the plurality of pieces of display data stored in the second storage device to a consecutive series of electronic papers for which the rewrite information permits rewriting, based on the rewrite information stored in the first storage device;

a display control device that respectively displays the plurality of pieces of display data allocated by the allocation device on the consecutive series of electronic papers;

a rewrite-permit device that, when the plurality of pieces of display data are respectively allocated to the consecutive series of electronic papers by the allocation device, changes the rewrite information on an electronic paper for which the rewrite information inhibits rewriting so that the rewrite information permits rewriting; and a restoration device that, after the plurality of pieces of display data have been respectively displayed on the plurality of electronic papers by the display control device, at a predetermined timing, returns the rewrite information changed to permit rewriting by the rewrite-permit device to once more inhibit rewriting, and restores the piece of display data stored in a third storage device provided in the electronic paper for which the rewrite information was changed to permit rewriting to the display surface of the electronic paper for which the rewrite information was changed to permit rewriting.

12. The output device according to claim 11, wherein the restoration device operates after a predetermined period of time has elapsed from the time at which the rewrite information is changed to permit rewriting by the rewrite-permit device.

13. The output device according to claim 11, further comprising:

a restoration instruction device that instructs restoration of the piece of display data stored in the third storage device, wherein the restoration device operates when an instruction is issued by the restoration instruction device.

14. The output device according to claim 11, further comprising:

a repetition control device that limits the number of times that the rewrite information can be changed to permit rewriting by the rewrite-permit device to a predetermined number of times or less.

15. The output device according to claim 11, further comprising:

a transfer device that transfers the piece of display data displayed on the electronic paper for which the rewrite information inhibits rewriting to another electronic paper, and displays the piece of display data on the electronic paper to which the piece of display data is transferred;

a rewrite information changing device that changes the rewrite information of the electronic paper from which the piece of display data is transferred by the transfer device to permit rewriting, and changes the rewrite information of the electronic paper to which the piece of display data is transferred to inhibit rewriting; and a consecutive reservation device that consecutively reserves electronic papers for which the rewrite information permits rewriting by transfer of the piece of display data by the transfer device and changing of the rewrite information by the rewrite information changing device; wherein the allocation device respectively allocates the plurality of pieces of display data to the electronic papers reserved by the consecutive reservation device, and when electronic papers for which the rewrite information permits rewriting have not been consecutively reserved by the consecutive reservation device, the rewrite-permit device changes the rewrite information on an electronic paper for which the rewrite information inhibits rewriting so that the rewrite information permits rewriting.

16. The output device according to claim 15, wherein the consecutive reservation device consecutively reserves the electronic papers to the front within the binding member.

17. The output device according to claim 15, wherein the consecutive reservation device consecutively reserves the electronic papers to the rear within the binding member.

18. The output device according to claim 11, further comprising:

a position information acquisition device that acquires position information detected by a position detection device provided in each of the plurality of electronic papers, the position information indicating a position of the each of the plurality of electronic papers within the binding member; and an order calculation device that calculates an order of binding of each of the plurality of electronic papers bound in a display device, based on the position information acquired by the position information acquisition device; wherein the allocation device respectively allocates the plurality of pieces of display data stored in the second storage device to the consecutive series of electronic papers for which the rewrite information permits rewriting, based on the order of binding calculated by the order calculation device and on the rewrite information stored in the first storage device.

19. The output device according to claim 18, further comprising:

an identification information acquisition device that acquires identification information to identify each of the plurality of electronic papers from the each of the plurality of electronic papers corresponding to the position information acquired by the position information acquisition device; wherein the allocation device respectively allocates the plurality of pieces of display data stored in the second storage device to the plurality of electronic papers in relation to the identification information acquired by the identification information acquisition device, and the display control device respectively displays the plurality of pieces of display data on the plurality of electronic papers having the respective identification information acquired by the identification information acquisition device.

20. A non-transitory computer-readable recording medium storing an output control program, wherein the output control program controls output of a piece of display data displayed on each of a plurality of electronic papers, the piece of display data being a piece of data for an image and/or a text in a page unit, the plurality of electronic papers being each provided with a display surface and bound together by a binding member, and the program comprises instructions that cause a controller to perform the steps of:

respectively allocating a plurality of pieces of display data to a consecutive series of electronic papers for which rewrite information permits rewriting, based on the rewrite information indicating whether or not to permit rewriting of the piece of display data on each of the plurality of electronic papers;

controlling display of the plurality of pieces of display data allocated in the allocating step on the consecutive series of electronic papers respectively;

permitting rewriting by changing the rewrite information on an electronic paper for which the rewrite information inhibits rewriting so that the rewrite information permits rewriting, when the plurality of pieces of display data are respectively allocated to the consecutive series of electronic papers in the allocating step; and restoring a stored display data to the display surface of the electronic paper for which the rewrite information was changed to permit rewriting, with returning the rewrite information changed to permit rewriting in the rewrite permitting step to once more inhibit rewriting, at a predetermined timing after the plurality of pieces of display data have been respectively displayed on the plurality of electronic papers in the display controlling step, the stored display data being a piece of data displayed on the electronic paper for which the rewrite information was changed to permit rewriting.

21. The non-transitory computer-readable recording medium according to claim 20, wherein the restoring step is executed after a predetermined period of time has elapsed from the time at which the rewrite information is changed to permit rewriting in the rewrite permitting step.

22. The non-transitory computer-readable recording medium according to claim 20, wherein the program further comprises instructions that cause the controller to perform the step of:

instructing restoration of the stored display data displayed on the electronic paper for which the rewrite information has been changed to permit rewriting; wherein the restoring step is executed when an instruction is issued in the restoration instructing step.

23. The non-transitory computer-readable recording medium according to claim 20, wherein the program further comprises instructions that cause the controller to perform the step of:

controlling repetitions, by limiting the number of times that the rewrite information can be changed to permit rewriting in the rewrite permitting step to a predetermined number of times or less.

24. The non-transitory computer-readable recording medium according to claim 20, wherein the program further comprises instructions that cause the controller to perform the steps of:

transferring the piece of display data displayed on the electronic paper for which the rewrite information inhibits rewriting to another electronic paper and displaying the piece of display data on the electronic paper to which the piece of display data is transferred;

changing the rewrite information of the electronic paper from which the piece of display data is transferred in the transferring step to permit rewriting, and changing the rewrite information of the electronic paper to which the piece of display data is transferred to inhibit rewriting; and consecutively reserving electronic papers for which the rewrite information permits rewriting by transfer of the piece of display data in the transferring step and changing of the rewrite information in the changing rewrite information step; wherein the allocating step respectively allocates the plurality of pieces of display data to the electronic papers reserved in the consecutive reserving step, and when electronic papers for which the rewrite information permits rewriting have not been consecutively reserved, changing the rewrite information on an electronic paper for which the rewrite information inhibits rewriting so that the rewrite information permits rewriting.

25. The non-transitory computer-readable recording medium according to claim 24, wherein the consecutive reserving step consecutively reserves the electronic papers to the front within the binding member.

26. The non-transitory computer-readable recording medium according to claim 24, wherein the consecutive reserving step consecutively reserves the electronic papers to the rear within the binding member.

27. The non-transitory computer-readable recording medium according to claim 20, wherein the program further comprises instructions that cause the controller to perform the steps of:

acquiring position information from each of the plurality of electronic papers, the position information being information indicating a position of the each of the plurality of the electronic papers within the binding member and detected in the each of the plurality of electronic papers; and calculating an order of binding of each of the plurality of electronic papers bound in a display device, based on the position information acquired in the position information acquiring step; wherein the allocating step respectively allocates the plurality of pieces of display data to the consecutive series of electronic papers for which the rewrite information permits rewriting, based on the order of binding calculated in the order calculating step and on the rewrite information.

28. The non-transitory computer-readable recording medium according to claim 27, wherein the program further comprises instructions that cause the controller to perform the steps of:

acquiring identification information to identify each of the plurality of electronic papers from the each of the plurality of the electronic papers corresponding to the position information acquired in the position information acquiring step; wherein the allocating step respectively allocates the plurality of pieces of display data to the plurality of electronic papers in relation to the identification information acquired in the identification information acquiring step; and the display controlling step respectively displays the plurality of pieces of display data on the plurality of electronic papers having the respective identification information acquired in the identification information acquiring step.

* * * * *